United States Patent [19]

Moriyama et al.

[11] Patent Number: 5,739,828
[45] Date of Patent: Apr. 14, 1998

[54] INK JET RECORDING METHOD AND APPARATUS HAVING RESOLUTION TRANSFORMATION CAPABILITY

[75] Inventors: Jiro Moriyama, Kawasaki; Shigeyasu Nagoshi, Yokohama; Toshiharu Inui, Yokohama; Yuji Akiyama, Yokohama; Kiichiro Takahashi; Fumihiro Gotoh, both of Kawasaki; Masao Kato, Yokohama, all of Japan

[73] Assignee: Canon Kabushiki Kaisha, Tokyo, Japan

[21] Appl. No.: 491,602

[22] Filed: Jun. 16, 1995

[30] Foreign Application Priority Data

| Jun. 17, 1994 | [JP] | Japan | 6-135695 |
| Jun. 30, 1994 | [JP] | Japan | 6-149372 |
| May 30, 1995 | [JP] | Japan | 7-131803 |

[51] Int. Cl.$^6$ ................ B41J 2/01; B41J 29/38
[52] U.S. Cl. ........................ 347/9; 347/14
[58] Field of Search ...................... 347/9, 14, 19

[56] References Cited

U.S. PATENT DOCUMENTS

| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,723,129 | 2/1988 | Endo et al. . |
| 4,740,796 | 4/1988 | Endo et al. . |
| 4,809,021 | 2/1989 | Check et al. . |
| 5,130,726 | 7/1992 | Fukushima et al. . |
| 5,208,605 | 5/1993 | Drake | 347/15 |
| 5,353,052 | 10/1994 | Suzuki et al. | 347/19 |
| 5,359,355 | 10/1994 | Nagoshi et al. . |
| 5,539,434 | 7/1996 | Fuse | 347/19 |
| 5,559,535 | 9/1996 | Otsuka et al. | 347/14 |
| 5,596,353 | 1/1997 | Takada et al. | 347/14 |
| 5,600,352 | 2/1997 | Knierim et al. | 347/40 |
| 5,633,662 | 5/1997 | Allen et al. | 347/19 |

FOREIGN PATENT DOCUMENTS

| 54-56847 | 5/1979 | Japan . |
| 55-132259 | 10/1980 | Japan . |
| 59-123670 | 8/1984 | Japan . |
| 59-138461 | 8/1984 | Japan . |
| 60-71260 | 4/1985 | Japan . |
| 63-237669 | 10/1988 | Japan . |
| 01212176 | 8/1989 | Japan . |

*Primary Examiner*—Stuart N. Hecker
*Attorney, Agent, or Firm*—Fitzpatrick, Cella, Harper & Scinto

[57] ABSTRACT

In a first recording mode for recording by discharging the ink of relatively large amount at a low resolution, liquid droplet discharging and recording conditions for the low resolution are set, while in a second recording mode for recording by discharging the ink of relatively small amount at a high resolution, a high resolution transformation process and a smoothing and thinning process are performed, and the liquid droplet discharging and recording conditions for the low resolution are set, wherein the recording control is performed in accordance with the recording mode which has been set.

43 Claims, 29 Drawing Sheets

INK JET RECORDING METHOD AND APPARATUS HAVING RESOLUTION TRANSFORMATION CAPABILITY

BACKGROUND OF THE INVENTION

1. Field of the Invention

The present invention relates to an ink jet recording method and apparatus for forming characters or an image by attaching ink droplets onto a recording medium, and more particularly to an ink jet recording method and apparatus which is capable of recording at m resolution using an ink jet recording head for n resolution (m>n), and which is suitable for high resolution recording or high gradation recording.

The present invention is applicable to all apparatuses which use such recording media as plain paper, special-purpose paper, cloth, and OHP sheet. Specific examples of such apparatuses applicable may include a printer, a copying machine, a facsimile etc.

2. Related Background Art

The ink jet recording has the advantages of lower noise, lower running cost, the ease of reducing an apparatus size, and the ease of realizing the multi-color. The color ink jet recording uses three inks of cyan (C), magenta (M), and yellow (Y), or four inks of those three colors and additionally black (Bk). Also, the color recording may be implemented using inks of green (G), red (R), and blue (B).

In the conventional ink jet recording, it has been required to use a special-purpose paper having an ink absorbing layer to obtain an image without ink blur. In recent years, with the improvement of inks, a method is put to practical use for providing the print aptitude to "plain paper" which is often used in large quantity with a printer and a copying machine.

However, in the state of the art, the recording quality at high resolution on "plain paper" still remains at a lower level. The cause thereof is mainly due to the ink blur adhering to a recording medium. A comparison between the recording on a special-purpose paper and recording on a plain paper designed in view of reducing the ink blur, with the same volume of ink droplets, reveals that the plain paper is naturally worse in blur than the special-purpose paper, and has obscure contours in a recorded area. In this way, since the plain paper is less advantageous in the recording at high resolution than the special-purpose paper, it is well known that the recording on the plain paper can be improved in the image quality by the recording with ink droplets of smaller volume.

On the other hand, there are well known many technologies concerning a smoothing process as a pseudo-method for enhancing resolution. For example, there is described in U.S. Pat. No. 4,809,021 a smoothing process for the recording using dots of three or more sizes. This is a technology using a variety of sizes of dots to record characters or the like more smoothly. With this method, the preparations for always recording dots of various sizes must be made. For example, it is necessary to have a recording head with various sorts of nozzle diameters, and a unit for transforming an image to be recorded into data corresponding to each nozzle diameter.

Also, a number of methods for enhancing the image quality have been proposed regarding the edge enhancement. For example, there is described in Japanese Laid-Open Patent Application No. 1-212176 a method of edge enhancement by differentiating an image signal at the secondary order and arithmetically operating an original image signal with smoothed data. This is a proposal concerning the edge enhancement at constant resolution. Numerous other proposals concerning the edge enhancement have been made to provide a number of well known means.

Also, there is described in Japanese Laid-Open Patent Application No. 55-132259 a method of effecting the gradation recording by changing the size of ink droplets to be discharged by providing a plurality of heating elements for the ink discharge for orifices of an ink jet head.

As above described, in the conventional ink jet recording, a variety of proposals for enhancing the recording quality of image have been made.

However, in an ink jet recording method or apparatus, using the conventional ink jet recording head with n resolution, which is capable of recording at m (>n) resolution, the quality or color of image formed on a recording medium changes if the recording is simply performed by transforming data in accordance with resolution, resulting in a less satisfactory image.

The present inventors have sought some causes which have some effect on the quality or color of image when resolution is changed. It has been found that various factors essentially having no significant effect on image by performing the ink jet recording at n resolution have greatly disturbed the image with ink droplets of substantially small size for high resolution.

Specifically, there is a problem that the upper limit of maximum ink shot amount per unit area of a recording medium which is set at n resolution may be exceeded by the transformed data of m resolution. In a print mode for the formation of color image or the recording of high image quality, there is a particular problem of especially degrading the image quality. Also, there is a further problem that such environmental conditions as temperature variation information of a recording head judged by a predetermined subroutine, or the information of changes in the ambient temperature and humidity where an apparatus is placed, may not be appropriately considered upon the resolution transform (or conversion), and disorder an image as variation factors. An exemplary problem is such that the recording conditions including the use of a fixing device, the humidity absorbing state of recording medium, ink characteristics, and further, such recording medium characteristics as ink absorbing property or material of recording medium, may disorder an image as the variation factors, without being appropriately considered, upon the resolution transform. Further, in a mode of modifying the initial setting conditions as a test print in the recording apparatus, it is believed as one of the causes that the setting of n resolution is only made, but the transformation recording at m resolution is not optimized. Also, there are some cases where the optimization of ink droplets as such can not be achieved because any proper measures such as cleaning, predischarge, suction recovery or pressure recovery of a head surface for stabilizing the recording head are not taken at the time of transformation of resolution.

SUMMARY OF THE INVENTION

Accordingly, the present invention is to resolve the above-mentioned problems associated with the conventional arts through the rationalization, upon the resolution transform, of at least one of a data variation factor in changing resolution, a variation factor in ink droplet amount from a recording head such as the environmental condition, an ink droplet image variation factor on such recording medium as a print mode or the recording condition, and the optimization of the apparatus initial condition setting or stabilizing means for the recording head.

In particular, in consideration of any one of such factors, it is possible to provide an ink jet recording method and recording apparatus which can perform the high quality recording in accordance with the characteristic of a recording medium, usually without regard to input image data or recording condition, wherein the drive condition for discharging ink droplets (ink volume×number) is set in the range not exceeding the maximum ink shot amount per unit area of the recording medium.

It is an object of the present invention to provide an ink jet recording method and recording apparatus which can perform the ink jet recording with high quality and at high resolution.

Also, it is another object of the present invention to provide ink jet recording method and recording apparatus which can perform the recording with high quality and at high resolution without regard to input data.

Further, it is another object of the present invention to provide ink jet recording method and recording apparatus which can also perform the recording at high resolution onto a plain paper.

In order to achieve the above objects, the present invention provides an ink jet recording method, using an ink jet recording head having n resolution, for performing the recording at m (>n) resolution onto the recording medium, characterized by including the steps of:

setting a print mode in accordance with the resolution;

setting the condition for discharging ink droplets (ink volume×number) in a range not exceeding the maximum ink shot amount per unit area of said recording medium in accordance with the recording conditions including the resolution and the recording medium and the environmental conditions;

creating binary data for recording from the multi-value data in accordance with the resolution and the set print mode; and forming the ink droplet image of the size in accordance with the resolution on said recording medium under the set conditions using said binary data for recording.

Also, the present invention provides an ink jet recording apparatus using an ink jet recording head having n resolution for performing the recording at m (>n) resolution, characterized by comprising:

means for performing a test print on said predetermined recording medium under the set conditions for discharging ink droplets (ink volume×number) in a range not exceeding the maximum ink shot amount per unit area of said predetermined recording medium in accordance with the resolution; and means for modifying said set conditions in accordance with said test print image.

Also, the present invention provides an ink jet recording apparatus using an ink jet recording head having n resolution for performing the recording at m (>n) resolution, characterized by comprising:

means for performing the recording in accordance with the resolution by changing the recording medium or the recording head driving condition; and means for stabilizing said recording head in accordance with the change of said resolution.

Also, the present invention provides an ink jet recording method using an ink jet recording head having n resolution for performing the recording at m (>n) resolution, characterized by including the steps of:

setting the condition for discharging ink droplets (ink volume×number) in a range not exceeding the maximum ink shot amount per unit area of said recording medium in accordance with the recording conditions including the resolution and the recording medium;

creating binary data for recording from the multi-value data in accordance with the resolution and the set print mode; and forming the ink droplet image of the size in accordance with the resolution on said recording medium under the set conditions using said binary data for recording.

Also, the present invention provides an ink jet recording method using an ink jet recording head having n resolution for performing the recording at m (>n) resolution on the recording medium, characterized by including the steps of:

setting a low resolution recording mode for recording at n resolution or a high resolution recording mode for recording at m resolution; and transforming the level of multi-value data to be recorded to be lowered, when said set recording mode is the high resolution recording mode.

Also, the present invention provides an ink jet recording method for effecting the recording using a recording head for discharging the ink, characterized by including the steps of:

setting a first recording mode for recording by discharging the ink of relatively large amount at a low resolution, or a second recording mode for recording by discharging the ink of relatively small amount at a high resolution;

transforming input data into recording data for driving said recording head in accordance with said first or second recording mode which has been set; and controlling the recording in accordance with the recording mode which has been set by said setting means, based on recording data transformed.

Also, the present invention provides an ink jet recording apparatus for performing the recording using a recording head for discharging the ink, characterized by comprising:

setting means for setting a first recording mode for recording by discharging the ink of relatively large amount at a low resolution, or a second recording mode for recording by discharging the ink of relatively small amount at a high resolution;

transformation means for transforming input data into recording data for driving said recording head in accordance with said first or second recording mode which has been set by said setting means; and recording control means for controlling the recording in accordance with the recording mode which has been set by said setting means, based on recording data transformed by said transformation means.

According to the above recording methods, it is possible to resolve the conventional problems which are left unreasonable upon the resolution transformation, thereby improving the quality or color of an image formed on a recording medium at high resolution to a satisfactory level.

Also, because ink droplets for high resolution can be made in high accuracy, better image quality can be assured. In particular, when the ink droplets for high resolution are relatively made smaller, its effects become remarkable.

Furthermore, preferably, many variation factors for the driving of a recording head can be precluded.

Moreover, it is possible to perform the high quality recording without blur suitable for input data or a recording medium, thereby effecting the recording of high resolution or high gradation.

With the above constitution, the recording is performed in such a way as to transform input data into recording data for driving a recording head in accordance with a recording mode, and record the recording data transformed, in accordance with the set recording mode, whereby it is possible to perform the recording of high quality at high resolution without regard to the input data.

DETAILED DESCRIPTION OF THE PREFERRED EMBODIMENTS

The preferred embodiments of the present invention will be described below in greater detail with reference to the drawings.

[EXAMPLE 1]

Figure 1:
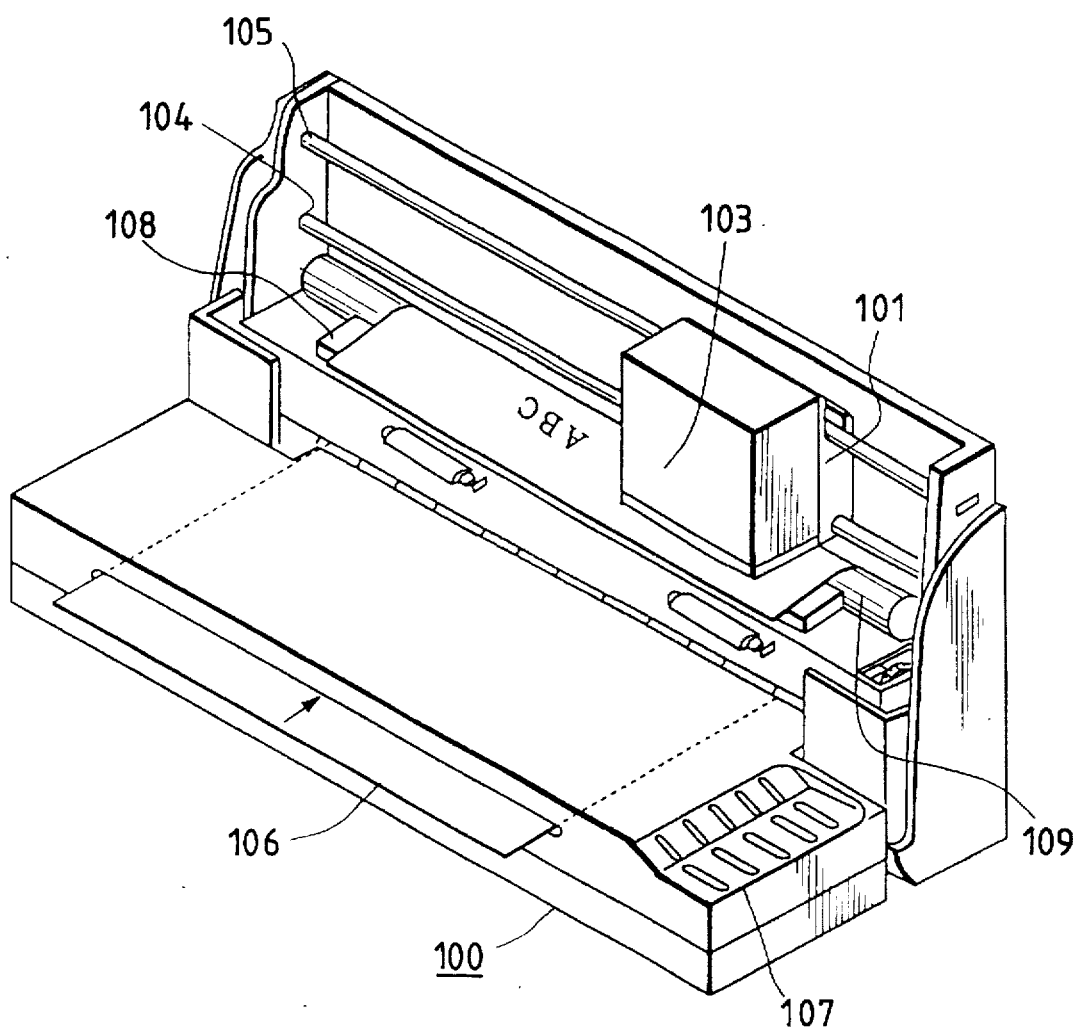
FIG. 1 is a perspective view of a recording apparatus to which the present invention is applicable.

FIG. 1 is a perspective view of an ink jet recording apparatus as one example to which the present invention is applicable. A recording medium 106 inserted in a paper supply position of a recording apparatus 100 is conveyed to a recordable area of a recording head unit 103 by a feeding roller 109. A metallic platen 108 is provided underneath the recording medium in the recordable area. A carriage 101 is configured to be movable in the directions defined by two guide shafts 104, 105 for the reciprocal scanning over the recording area. On the carriage 101 is mounted the recording head unit 103 containing ink tanks for supplying four color inks and recording heads for discharging the inks. Four color inks provided for the ink jet recording apparatus of this example are black (Bk), cyan (C), magenta (M) and yellow (Y). Reference numeral 107 represents a switch group and a display element group for the display of various settings of the recording mode and the state of recording apparatus.

Figure 2:
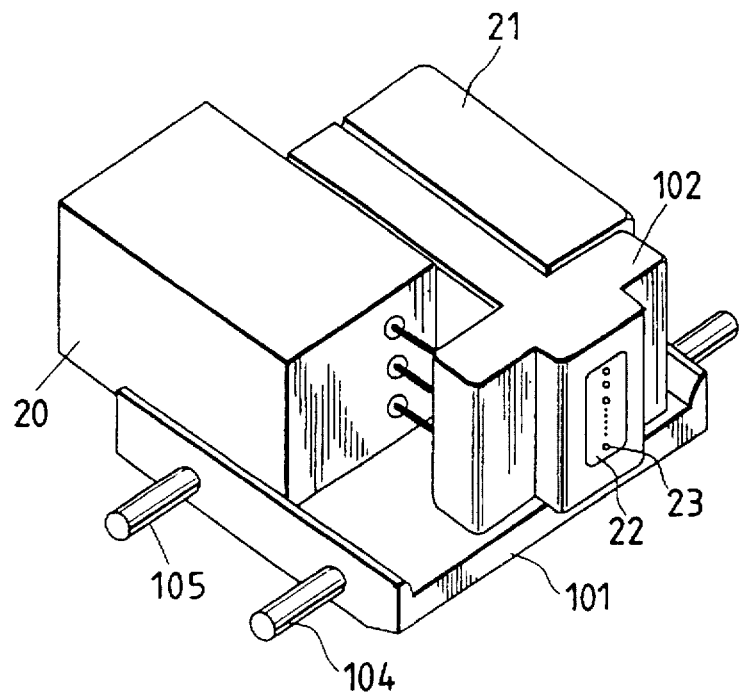
FIG. 2 is a perspective view of a recording head unit.

FIG. 2 is a perspective view of the recording head unit 103. A black ink tank 21 for storing the black ink, and a color ink tank 20 for storing the other three color inks together are coupled to the recording head 102 through the pipes, respectively, so that the ink of each tank can be supplied to the recording head 102. On a discharge orifice face 22, there are linearly arranged a plurality of discharge orifices 23 corresponding to each color of Bk, C, M and Y. The number of discharge orifices for each color is 32. The spacing between discharge orifices which are provided 32 for each color is equal to a pitch of about 70 μm, wherein discharge orifices are arranged linearly at a density of 360 dpi. The arrangement of discharge orifices is provided with a spacing equal to a pitch of 8 dots between each color. Also, the arrangement of discharge orifices is provided in the order of Bk, C, M and Y.

The ink jet recording apparatus of this example having electrothermal converters arranged corresponding to liquid channels (nozzles) of the ink adopts a recording method of applying a drive signal corresponding to recording information to electrothermal converters to discharge the ink from the nozzles.

Figure 3:
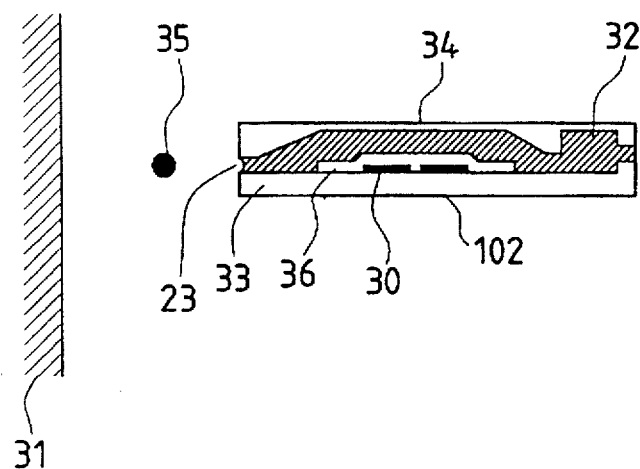
FIG. 3 is an enlarged cross-sectional view of a recording head.

FIG. 3 is an enlarged cross-sectional view near an electrothermal converter of the recording head.

A heating element 30 which is the electrothermal converter of the recording head can generate the heat individually for all the nozzles.

The ink within the nozzle, rapidly heated due to heating of the heating element 30, forms a bubble owing to film boiling, so that an ink droplet 35 is discharged to the recording medium 31 due to a pressure of this bubble created as shown in FIG. 3 to form the character or image on the recording medium. The volume of ink droplet for each color discharged at this time is from 40 to 60 ng.

Each of the discharge orifices 23 is provided with an ink liquid channel communicating to each discharge orifice, and a common liquid chamber 32 for supplying the inks to those liquid channels is provided behind the ink liquid channels arranged. Each ink liquid channel corresponding to each of the discharge orifices is provided with a heating element 30 which is an electrothermal converter for generating the heat energy used to discharge ink droplets from each of the discharge orifices, and an electrode wiring for supplying the electric power thereto. These heating elements 30 and electrode wirings are formed on a substrate 33 made of silicon by film formation technology. On the heating element 30 is formed a protective film 36 to protect the heating element against direct contact with the ink. Further, by laminating a partition wall 34 made of resin or glass material on this substrate, the discharge orifices, the ink liquid channels, and the common liquid chamber are constructed.

In this way, the recording method of using the electro-thermal converters relies on the employment of bubbles formed by applying heat energy in discharging ink droplets, and is commonly referred to as a bubble jet recording method.

Figure 4:
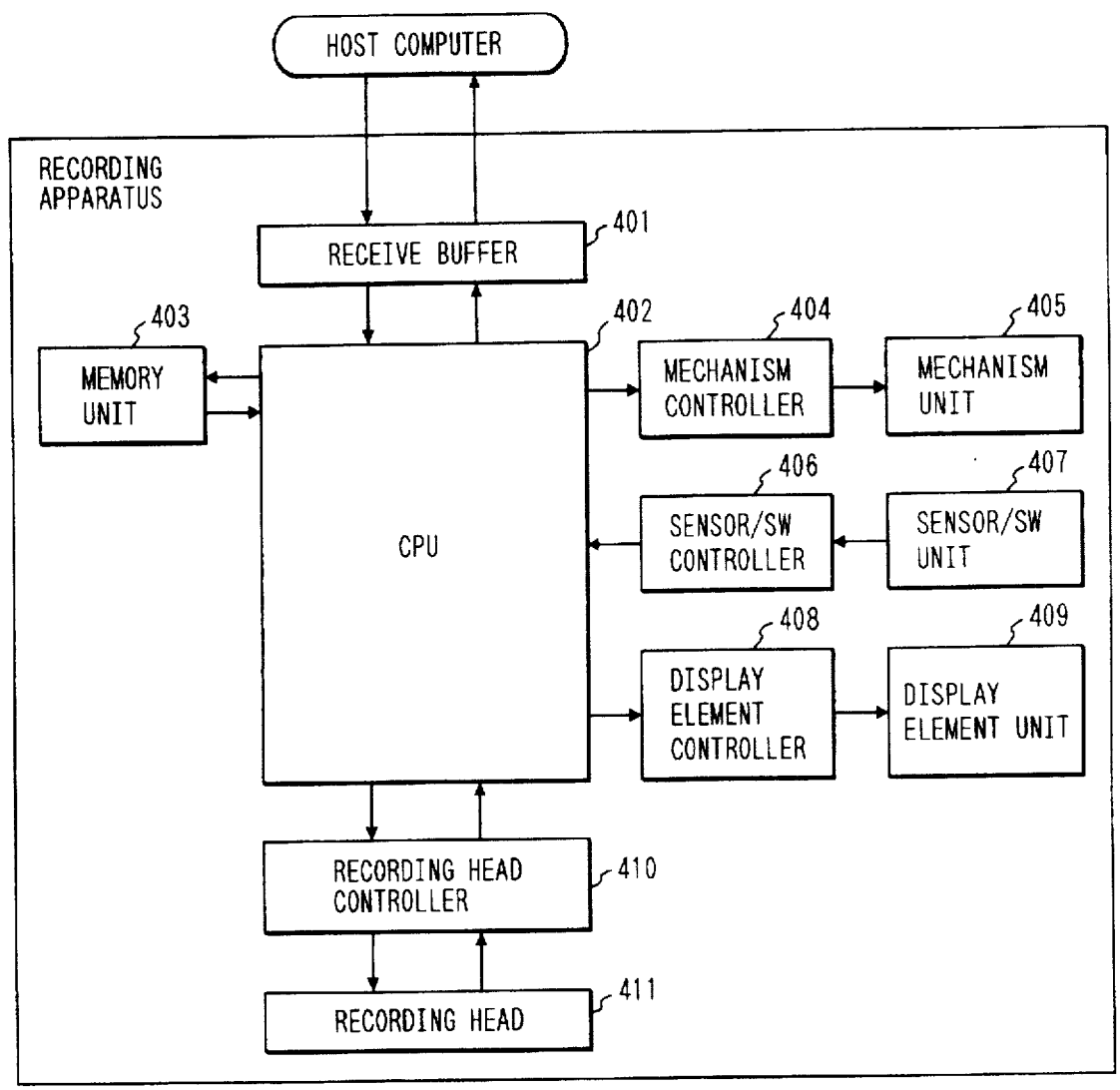
FIG. 4 is a block diagram of the recording apparatus to which the present invention is applicable.

FIG. 4 is a block diagram of an ink jet recording apparatus to which the present invention is applicable. The character or image data to be recorded (hereinafter referred to as "image data") is input from a host computer into a receiving buffer 401 of the recording apparatus. Also, data for the confirmation of whether or not the data has been correctly transferred or data notifying the operating condition of recording apparatus is returned from the recording apparatus back to the host computer. The data in the receiving buffer 401 is transferred to a memory unit 403 under the control of a CPU 402 and temporarily stored in a RAM (random access memory). A mechanism control unit 404 drives a mechanism unit 405 including a carriage motor and a line feed motor, upon an instruction from the CPU 402. A sensor/SW control unit 406 sends a signal from a sensor/SW unit 407 composed of various sorts of sensors and SWs (switches) to the CPU 402. A display element control unit 408 controls a display element such as LED on the display panel group, upon an instruction from the CPU. A recording head control unit 410 controls a recording head 411, upon an instruction from the CPU. Also, it senses temperature information indicating the state of the recording head 411 for the transfer to the CPU 402.

Figure 5:
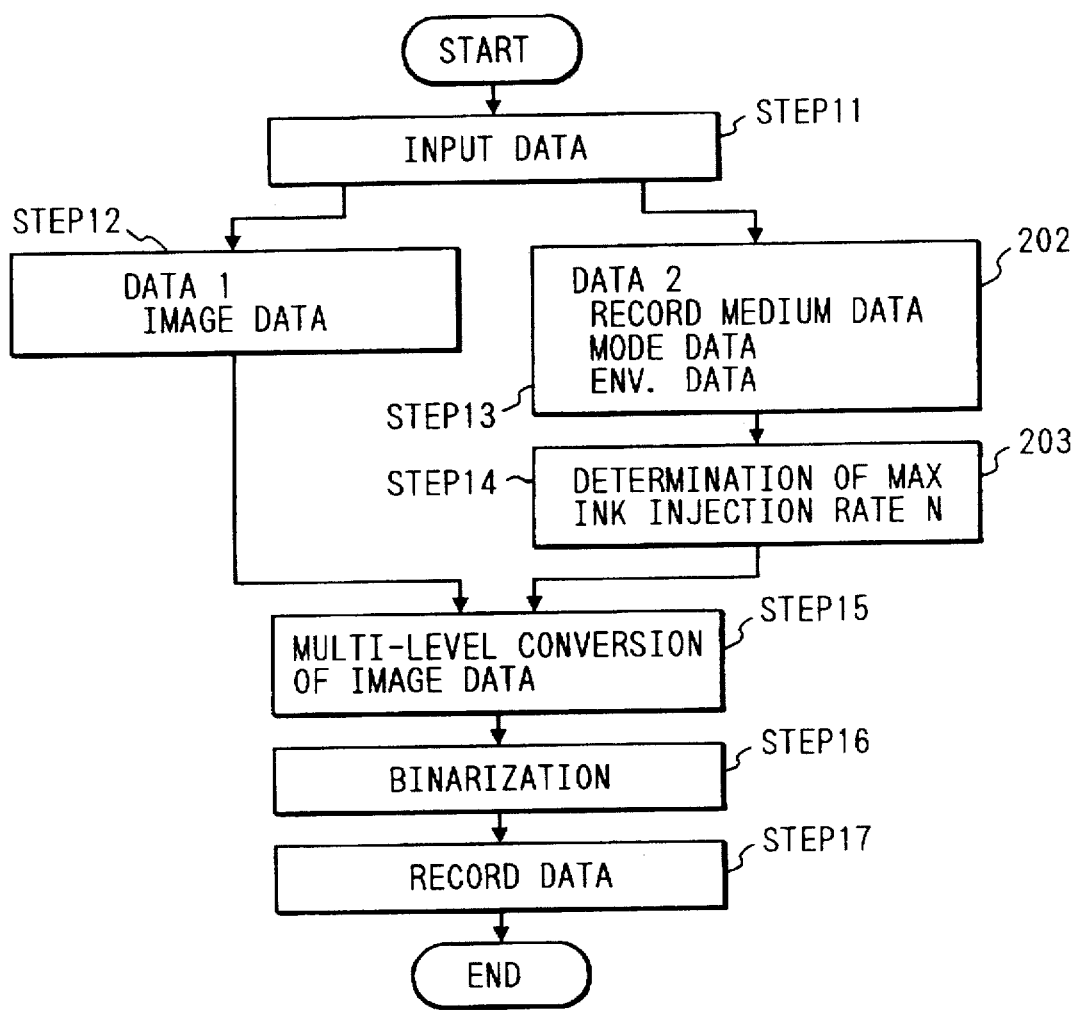
FIG. 5 is a flowchart for an example 1.

FIG. 5 is a flowchart for an example 1 of processing the recording data.

STEP 11 is a step of sending input data to the CPU 402 of the recording apparatus. The input data consists of data sent from the receiving buffer, data sent from the sensor/SW control unit, and data sent from the recording head control unit.

STEP 12 is a step of getting image data that is a part of input data sent from the receiving buffer (hereinafter referred to as "data 1"). When the density adjustment is made by the user on the host computer or SW unit of the recording apparatus, the density adjusted image data results. Herein, the image data is assumed to be multi-value data.

STEP 13 is a step for control data determining means 202, i.e., a step of getting medium data, mode data and environmental data (hereinafter referred to as "data 2"), which is a part of input data. Herein, by medium data is meant either setting data sent from the host computer, indicating of which type the recording medium is among a specific coat paper, a plain paper, a transparency paper, or others, or data set in the sensor/SW unit within the recording apparatus. By mode data is meant data indicating whether fast recording mode or high quality recording mode is effective. By environmental data is meant data indicating the environmental conditions such as the temperature of recording head, temperature of the ink for recording, and temperature or humidity within the recording apparatus. The control data of the recording apparatus can be determined from these data.

STEP 14 is a step for maximum ink shot (or injection) rate determining means 203. The maximum ink shot (or injection) rate N is a determined from data 2. When usable recording medium is prespecified, that is, when it is supposed that the special recording medium with increased ink absorbability is used to form ink droplet image for the high resolution, the maximum ink shot rate N may be obtained by correcting for a reference shot rate N prememorized in the apparatus under the above environmental conditions.

Here, a specific example is presented below. Since the "maximum ink absorption permissible amount per unit area: IMax" is determined by the data 2, the maximum ink shot rate N is determined from IMax.

Since the recording condition as the reference is dependent upon the used ink characteristics, as an example, the following composition is used:

| | |
|---|---|
| Glyceline | 5.0 wt % |
| Thiodiglycol | 5.0 wt % |
| Urea | 5.0 wt % |
| Isopropyl alcohol | 4.0 wt % |
| Acetylenol EH | 0.5 wt % |
| Dyes | 3.0 wt % |
| Water | 77.5 wt % |

(dyes corresponding to respective colors of Y, M, C and Bk.) Also, the conditions of the specific-purpose coat paper, high quality mode, temperature 25° C., humidity 60% RH, and head temperature 35° C. were used. Then, IMax is about 20 μg per square mm. This is about 100 ng in terms of unit area with a unit of 360 dpi square. In this way, if the maximum ink shot rate N is defined with respect to a certain reference that has been set depending on the recording medium or recording condition for use, the relative changes can be represented. In this example, the ratio relative to 100 ng as above mentioned is used. For instance, under the recording condition where IMax is 60 ng, N=0.6.

IMax can be determined as follows. In practice, the boundary at which the used ink color changes is formed in a relatively wide area of the recording medium, and the degree of blur on this boundary is given a certain reference, such that if the blur occurs beyond this reference, IMax is defined. In this example, when the amount of ink to smear out a plane of 1 inch square to realize various colors including ink blend color (R, G, B) and Bk (black), using monochrome (Y, M, C) inks, yields the blur of the ink beyond a fixed value (e.g., 2 in the minimum recording pixel unit) between adjacent different colors, IMax is defined as the limit value. Besides, it may be determined by the fixing property immediately after the recording.

STEP 15 is a step for changing the multi-value level (or multi-level) of image data for data 1, based on the maximum ink shot rate N. An output data Dout after the change is calculated using a transformation (or conversion) function func, Dout=func (N, Din) where the input data Din and N are the parameters.

Figure 6:
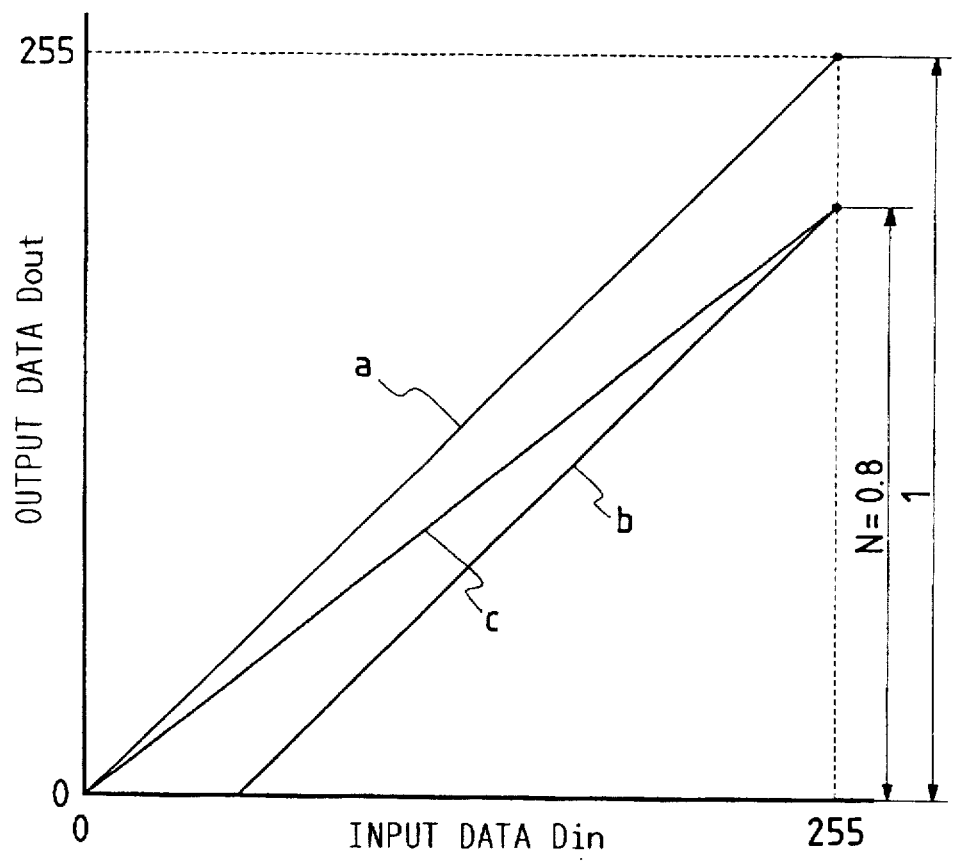
FIG. 6 is a chart showing an image data transformation process for the example 1.

FIG. 6 is a chart showing a specific image data transformation process of the example 1. With a typical gamma transformation (or conversion), the input data Din of 8 bits with 256 gradations is transformed (or converted) into output data Dout of 8 bits with 256 gradations. This example is one in which the recording paper is a specific plain paper in view of the above recording condition as the reference, and N=0.8. The volume of one ink droplet to be discharged is controlled to be constant at 50 ng. In the color recording, R, G, B as the secondary color are represented by superimposing Y, M, C on one another, whereby it follows that a total of 100 ng is recorded in a unit area of 360 dpi square. When N=1, no change is necessary, but when N=0.8, that amount is too much. Thus, the following transformation process is performed to reduce the average ink discharge amount per unit area.

A transformation function is defined as the straight line b in which the output data relative to the maximum value of input data is 0.8, which can be obtained by parallel movement from the straight line a, which is a transformation function having a one-to-one relation between input data and output data. This transformation function has the merit that the highlight recorded portion has less graininess, because an offset processing for cut input value in the area where Din is small is effective. Herein, when N is greater than 1, Dout=Din results without transformation of input data.

This transformation processing is a processing for optimizing the ink droplet shot amount for recording on the recording medium. By the ink droplet shot amount is meant the volume of ink droplets per dot to be discharged toward the recording medium, or the number of ink droplets, or both. Herein, the volume of ink droplets was controlled to be always fixed. Therefore, the number of ink droplets per unit area was optimized. Other methods may include changing variably the volume of ink droplets per dot, or both the volume and the number.

In this example, the volume of ink droplets is controlled to be always fixed, in which if N is greater than 1, no transformation of input data is made to have Dout=Din, but the volume of ink droplets is controlled to increase correspondingly, whereby the effects can be obtained over the wider range. Specific means for increasing the volume of ink droplets involves increasing the energy applied to the heating element of recording head in discharging the ink, or reducing the viscosity of the ink by raising the temperature of the ink to be discharged.

Further, the transformation function for transforming the multi-value level of image data is not the straight like b of FIG. 6, but may be, for example, a transformation of multiplying input data by N, as indicated by the straight line c. Or it may be a non-linear function.

STEP 16 is a step of binarizing the multi-value data. Herein, a well-known error diffusion method is used.

STEP 17 is a step for determining image data binarized for the transformation into the recording data for driving the recording head of recording apparatus.

The recording data processed in the above flow is sent to the recording head controller unit 410 to allow the recording head 411 to record the recording data.

[EXAMPLE 2]

The example 1 was described in connection with the case wherein input image data is multi-value data. The present invention is not limited thereto, and this example is described in connection with the case wherein input recording data is binary data.

Figure 7:
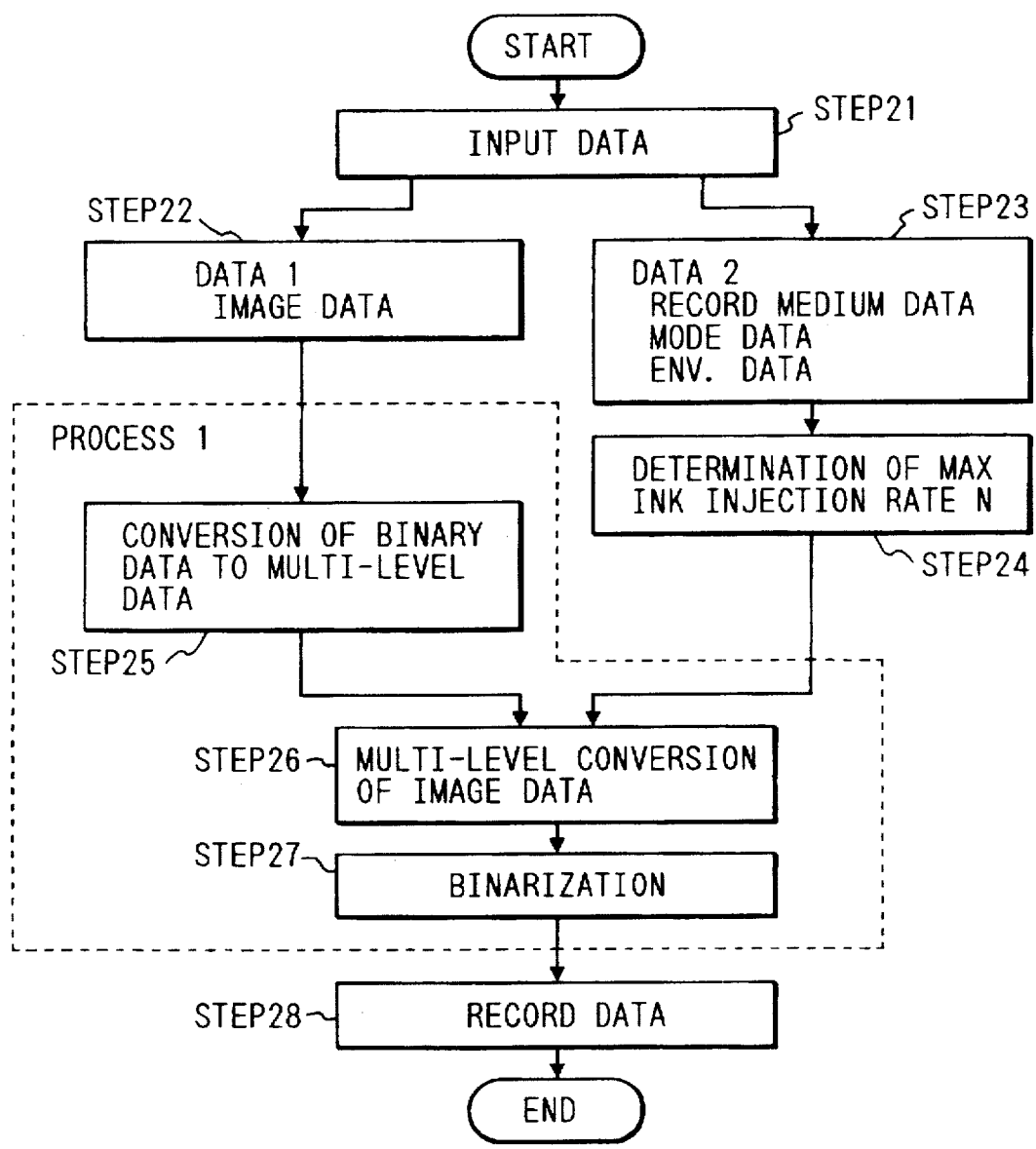
FIG. 7 is a flowchart for an example 2.

FIG. 7 is a flowchart for processing recording data in this example.

STEP 21 is a step of sending input data to the CPU 402. STEP 22 is a step, like STEP 12, of getting data 1 which is image data from input data. However, input image data is binary data.

STEP 23 is a step identical to STEP 13, and STEP 24 is a step identical to STEP 14.

STEP 25 is a step of transforming binary data into multi-valued data (or multi-level data). STEP 26 is a step identical to STEP 15, STEP 27 is a step identical to STEP 16, and STEP 28 is a step identical to STEP 17.

In this way, even when input image data is binary data, the data process of the present invention is also effective.

Herein, the portion of the broken line designated as process 1 in FIG. 7 may rely on a different processing method from the above process. For example, it may rely on a pattern processing method in which the minimum unit of recording pixel is supposed to be 1, and the mask data of 16×16 created or selected based on N is arithmetically operated on the image data.

[EXAMPLE 3]

The examples 1 and 2 have been described in connection with the case wherein input image data was multi-valued or binary data. This example is described in connection with the case wherein input data is composed of the mixture of multi-valued data and binary data.

Figure 8:
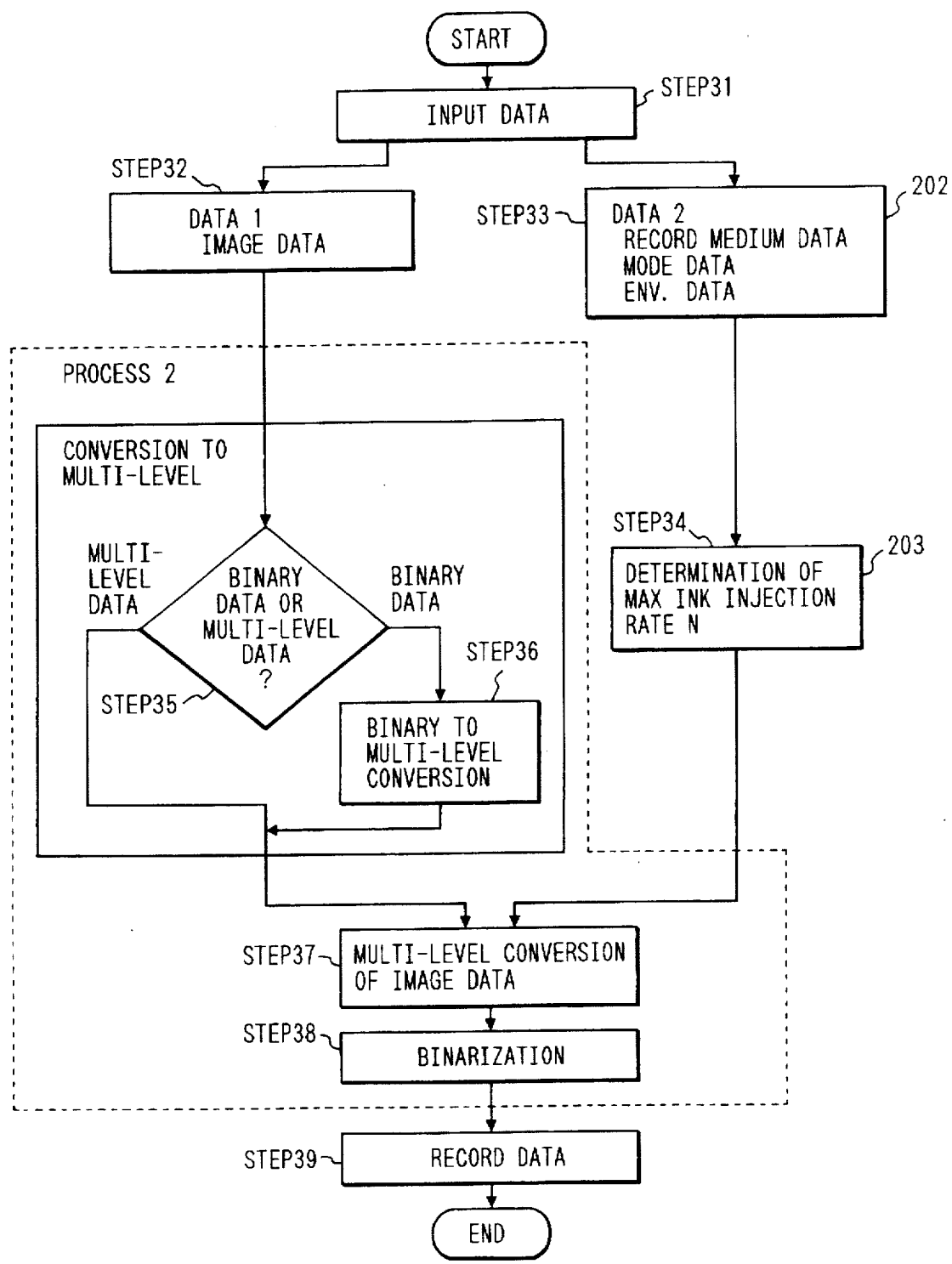
FIG. 8 is a flowchart for an example 3.

FIG. 8 is a flowchart for processing image data composed of the mixture of multi-valued data and binary data.

STEP 31 is a step of sending input data to the CPU 402 of recording apparatus. STEP 32 is a step of getting image data which is data 1 from input data. However, input image data is the mixture of binary data and multi-valued data.

STEP 33 is a step identical to STEP 13, and STEP 34 is a step identical to STEP 14.

STEP 35 is a step of judging whether data is multi-valued or binary. If data is multi-valued, no processing is made, but if it is binary, binary data is transformed into multi-valued data at STEP 36.

STEP 37 is a step identical to STEP 15, STEP 38 is a step identical to STEP 16, and STEP 39 is a step identical to STEP 17.

In this way, even when input image data is the mixture of binary data and multi-valued data, the data process of the present invention is also effective.

Herein, process 2 indicated by the broken line covering the section as designated by a multi-value transformation (or multi-level conversion) process in FIG. 8 may rely on a different processing method from the above process. For example, it may rely on a pattern processing method in which the minimum unit of recording pixel is supposed to be 1 for the binary data, and the mask data of 16×16 created or selected based on N is arithmetically operated on image data.

[EXAMPLE 4]

In the example 1, there is no distinction of whether input image data was black (Bk) or color (Col=Y or M or C). The favorable effect will be provided by making distinction between black and color. To record in RGB, the color is recorded by superposing YMC on one another, and therefore results in greater amount of consumption of the ink discharged onto the recording medium than Bk. Conversely, Bk can be discharged in a greater amount. This example makes judgment whether input image data is black or color.

Figure 9:
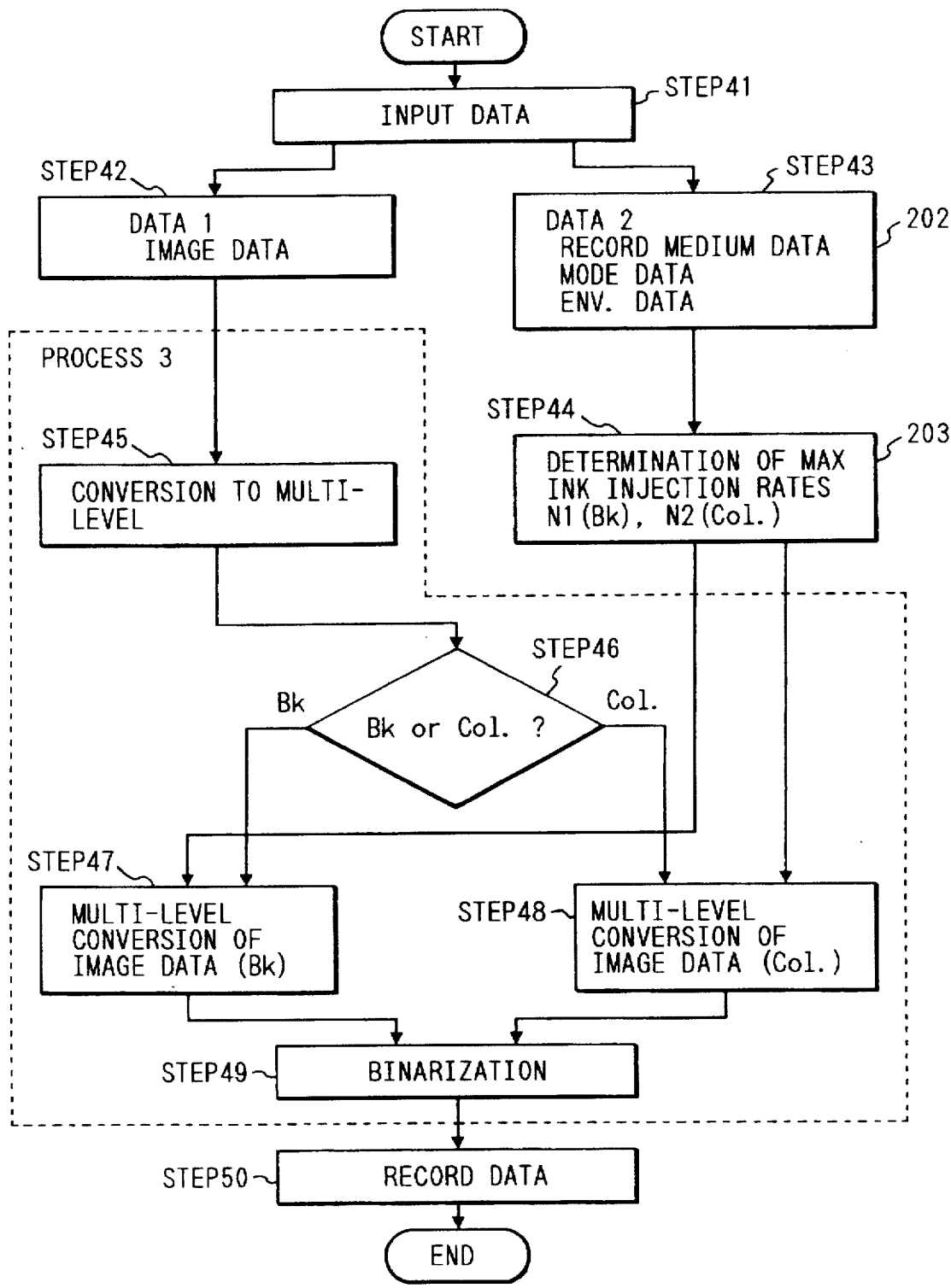
FIG. 9 is a flowchart for an example 4.

FIG. 9 is a flowchart for processing data for optimal recording by distinguishing whether image data is black or color.

STEP 41 is a step of sending input data to the CPU 402 of the recording apparatus. STEP 42 is a step of getting image data which is data 1. However, the image data herein is the mixture of black and color data.

STEP 43 is a step identical to STEP 13. STEP 44 is a step similar to STEP 14, wherein the maximum shot rates N1 and N2 for black and color are determined separately. Since the ink discharge amount of black and the ink discharge amount of color are equalized to 50 ng, respectively, N1=2×N2 results.

STEP 45 is a step of the multi-value transformation process for the image data. STEP 46 is a step of judging whether image data which is multi-valued valued data is black or color. If image data is black, the operation goes to STEP 47, while if image data is color, the operation goes to STEP 48. More preferably, the following processing is performed separately by judging each color of Bk, C, M and Y. Herein, this step makes judgment between black and color.

STEP 47 is a step, similar to STEP 15, of changing the multi-value level of black for image data which is data 1, based on the maximum shot rate. Likewise, STEP 48 is a step of changing the multi-value level of color for image data which is data 1, based on the maximum shot rate N2. After passing through the process of changing the multi-value level independently of each other, the operation goes to STEP 49.

STEP 49 is a step identical to STEP 16, and STEP 50 is a step identical to STEP 17.

Herein, the ink discharge amount may be different between black and color. Generally, in the recording system making use of much black, the ink discharge amount of black is increased. Even in this case, the similar processing is performed.

Also, the judgment for distinguishing between black and color may be made between Bk and C or M or Y or Bk containing area, but not between Bk and C or M or Y. This is a process of judging the black in the area for recording the natural image, e.g., a photograph to be included in the color, and suitable for the recording of natural image.

Herein, the process for the section surrounded by the broken line designated by process 3 in FIG. 9 is only necessary to include a step of judging whether image data is black or color, and may be performed by pattern matching.

[EXAMPLE 5]

This example is a process, in addition to the example 1, of processing the edge portion of image data differently from the non-edge portion, thereby bringing about more favorable effects.

Figure 10:
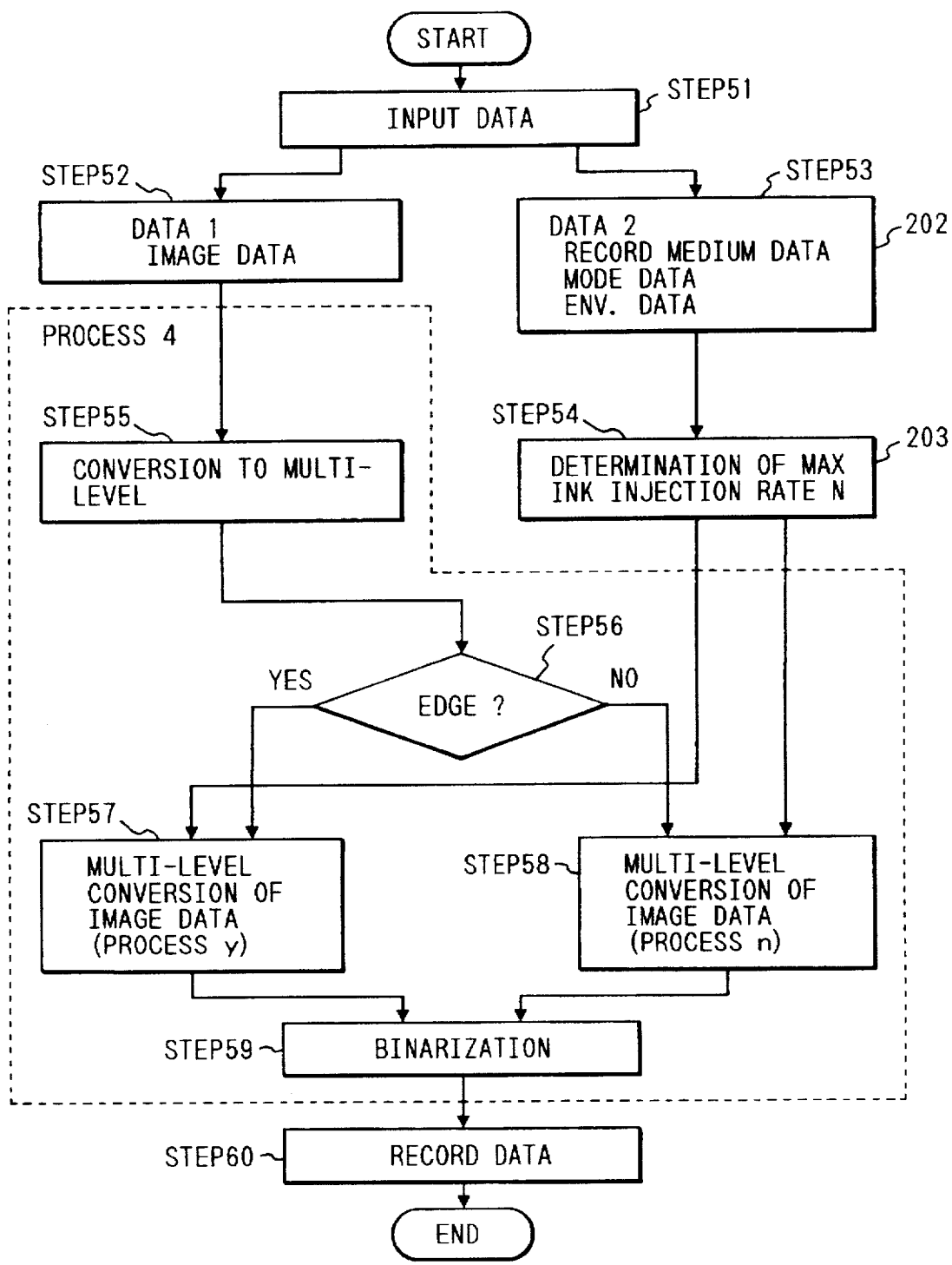
FIG. 10 is a flowchart for an example 5.

FIG. 10 is a flowchart for processing the edge portion differently from the non-edge portion of image data.

STEP 51 is a step, like STEP 11, of sending input data to the CPU 402 of the recording apparatus. STEP 52 is a step of getting image data which is data 1. STEP 53 is a step identical to STEP 13. STEP 54 is a step identical to STEP 14, for determining N.

STEP 55 is a step of multi-value transformation processing. STEP 56 is a step of judging whether image data is edge portion or not in terms of a unit of minimum pixel. If image data is edge portion (yes), the operation goes to STEP 57, while if not (no), the operation goes to STEP 58.

Though STEP 56 judges whether or not image data is the edge portion, it is possible to add the condition "input level is maximum or nearly maximum" to the requirements, such that only if both are yes, the operation goes to STEP 57. This is because there are some cases where all data representing the half-tone in the multi-value level is better to determine as the non-edge portion. For example, the black recording pixel in the gray representing area may result in higher density if it is processed for the recording with its edge portion emphasized. If, the multi-valued level is judged to be the "maximum input level", the half-tone does not have such higher density problem because the half-tone is not maximum input level. Also, in the "nearly maximum input level", there is considerably no higher density problem, if 250 or greater level is treated, with 256 gradations, for example.

STEP 58 is a step of changing the multi-value level for the non-edge portion of recording data. This step is a processing identical to STEP 15.

STEP 57 is to change the multi-value level of the edge portion of recording data. This step is different from STEP 15. Typically, the maximum ink absorbing amount into the recording medium can be determined with the image having its relatively wide recording area smeared out. This is because the image having relatively wide recording area smeared out is in the severest condition. However, in the edge portion, the ink is more liable to permeate from the recording area into the non-recording area, so that its condition is slightly relieved. Thus, in the edge portion, the multi-value level may be changed to a greater value than N. For example, 1.1 times N is employed. Or the edge portion is made through where the multi-value level is not changed. The detail settings thereof depend on the ink or recording medium used, or other conditions. In any way, the edge portion is processed to have more ink discharged thereto than the non-edge portion. This is due to the recording characteristic that the ink discharge amount on the edge portion can be made greater than the non-edge portion, and the well known fact that in recording the character or image, the quality is enhanced if its edge portion is recorded more densely. Also, because the edge portion has the increased density of recorded image by discharging as many ink droplets as possible. Since the relatively wide area but the edge portion which is recorded at high recording density may often not be reflected to the recorded image even if the resolution is increased, it is meaningful to effect the recording by taking preference of the density.

STEP 59 is a binarization process by compositely processing the image data of which the edge portion and the other portion are separately processed. STEP 60 is identical to STEP 17.

Herein, the processing for the portion surrounded by the broken line and designated by process 4 in FIG. 10 is sufficient to include a step for determining whether or not the image data is the edge portion and separately processing the data, and may be performed by pattern matching.

Also, a determination whether or not image data is the edge may be made by well known means. Typically, the edge portion is supposed to be an outermost contour in terms of a unit of minimum recording resolution of recording image. Herein, the edge portion is not necessarily only the outermost contour, but may be two-pixel area including the outermost contour and its inner contour, depending on the recording condition. Or about a ten-layer contour may be conceived, depending on the recording condition. This is advantageous in overcoming the drawback that if the error diffusion method is used in the binarization process at STEP 59, for example, error data components which are diffused by processing the natural image such as a photograph may be superimposed on the character written on the natural image, making the character obscure.

Further, the edge portion may be ORed data of each color, but not data for each color of Bk, Y, M and C. This is because the boundary between each color is the edge for each color, but not the edge as the recording area.

Figure 11:
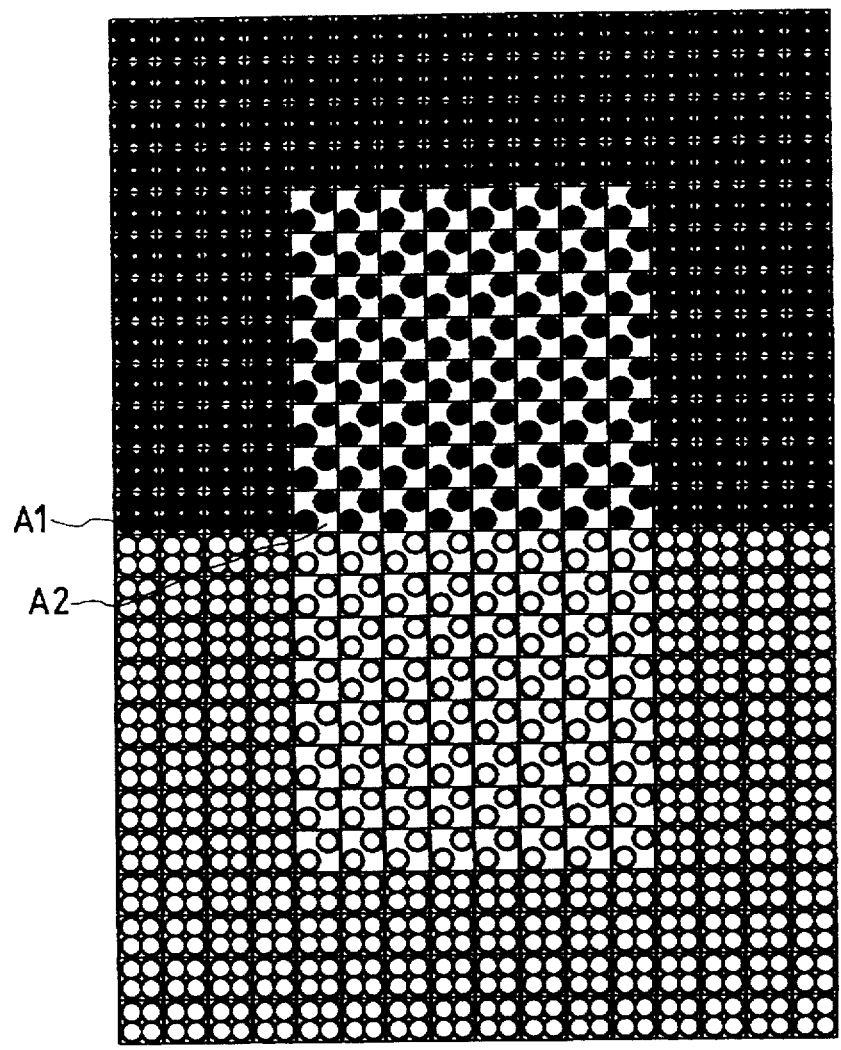
FIG. 11 is a view illustrating the image data processed in the example 5.

FIG. 11 is an example in which the black and yellow boundary is processed in accordance with the flow of FIG. 10. Black dot indicates black recording data, and white dot indicates yellow recording data.

Input image data is composed of black and yellow adjoining in 24 in breadth×32 in length pixels for each color at the minimum recording resolution. This is the case wherein eight pixels on the edge portion of ORed data of black data and yellow data remain unchanged, and the interior is subjected to one-half transformation process.

[EXAMPLE 6]

An example 6 of the present invention will be described below.

Figure 12:
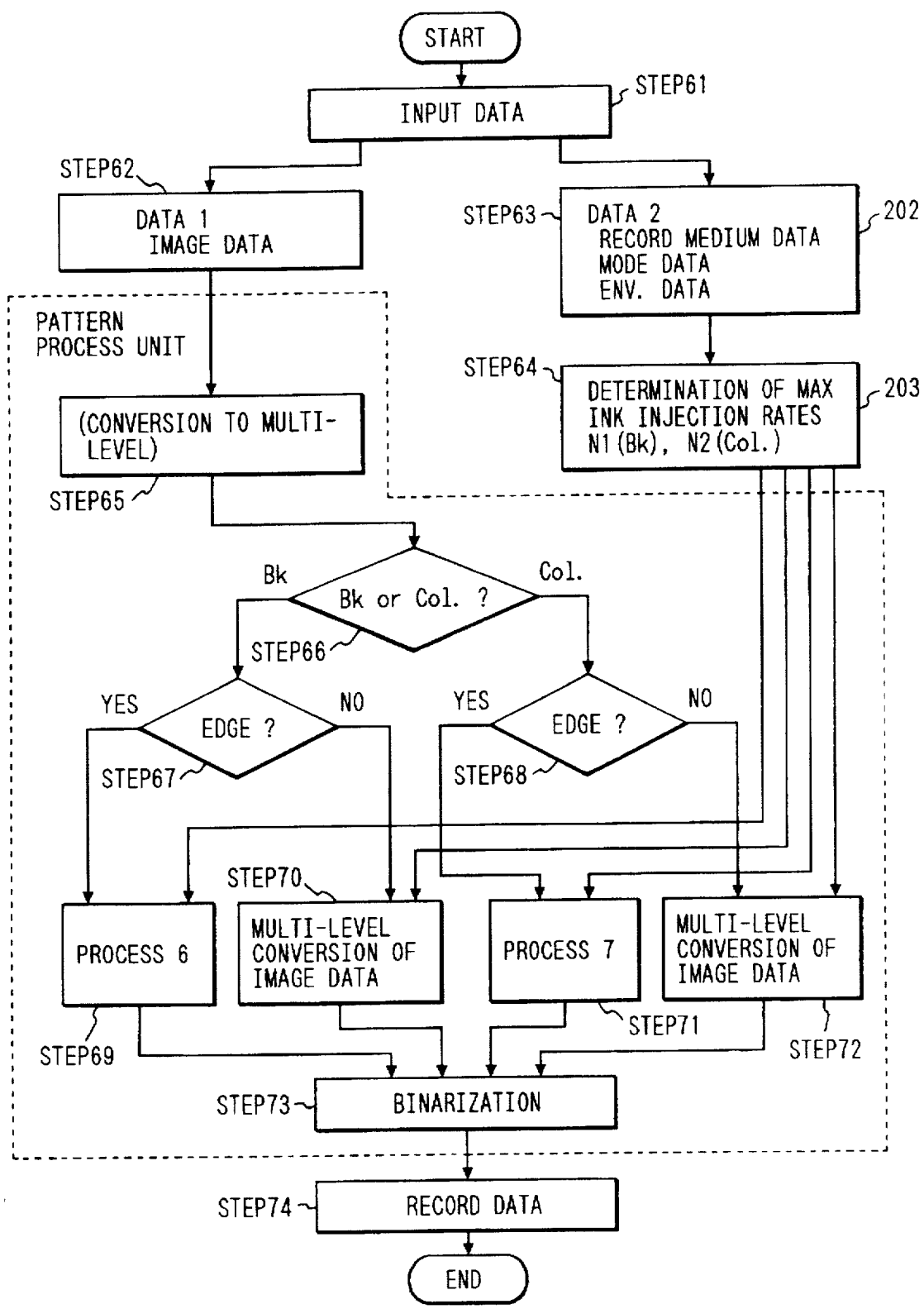
FIG. 12 is a flowchart for an example 6.

FIG. 12 is a flowchart for explaining this example. The image data to be recorded is a full-color image, and a process where image data including various kinds of object image data has been input is presented. Various kinds of object image data include character data, natural image (full-color) data, graph (sevencolor) data, binary data, and multi-value data. Also, the image data is described wherein the resolution of image data to be input is 360 dpi, the image size is A4, and the gradation level is 8 bits for each color.

STEP 61 is a step of dividing input data sent from the host computer into data 1 which is image data and data 2 which is control data for the transfer of data to respective steps (STEPs 62, 63).

At STEP 62, image data is divided into header information (image resolution, image size, data depth indicating whether the gradation number is 2 bits or 8 bits, object information, etc.) and image data which are then transferred to a pattern processing unit.

STEP 63 is a step of processing by control data determining means. The control information such as the recording path number in the recording operation, mask pattern, the driving conditions of recording head, one-way or two-way recording, the intermittent feeding amount of recording medium in the recording operation, which can be determined by recording medium data, mode data and environmental data, is sent to the pattern processing unit. The two-way recording is described herein with the recording medium being a special-purpose coat paper, and with the recording path number being 2.

STEP 64 is a step of processing by maximum ink shot rate determining means 203. N1 and N2 which are respective maximum ink shot rates for black and color (C, M, Y) are determined from the recording medium data, mode data and environmental data. Herein, N1=0.9 and N2=0.8 are assumed.

Next, the pattern processing unit surrounded by the dot line performs a processing to obtain the optimal recorded image under the respective conditions of data 1 and data 2.

STEP 65 is a multi-value transformation process, but since image data is multi-valued data, the operation goes directly to the next step.

STEP 66 determines whether image data is black or color. If image data is black, the operation goes to STEP 67, while if it is color, the operation goes to STEP 68.

STEP 67 and STEP 68 are steps of judging whether or not image data is the edge portion.

STEP 67 performs the edge detection through the well known secondary differential process. Also, STEP 68 performs edge detection through the well known primary differential process. The reason why STEP 67 and STEP 68 are involved in different edge detection is that black data is most frequently used for the character data which is data to read, and preferably has higher detection accuracy of edge than as used as the inking (UCR) in the natural image. On the other hand, color data is often data for viewing the recorded image as the natural image such as a graph or a picture, and is preferable to undergo smoother processing than black. Other methods may include carrying out the same edge processing for both STEP 67 and STEP 68 for the simplification of the process.

STEP 69 is a step of processing black image data judged as the edge portion. Process 6 is conducted based on the maximum ink shot rate N1 of black which is determined at STEP 64. An example of process 6 is to effect recording at a resolution of 720 dpi which is twice the resolution of original image by applying well known smoothing process to only pixels on the outermost contour of the edge portion. Further, it is transformed to data to be recorded with up to four ink droplets in the minimum recording pixel at a resolution of 360 dpi. Then, since the ink discharge orifices for the recording head have a pitch of 360 dpi, the recording head will scan over the recording area twice for the recording at a resolution of 720 dpi.

Figure 13:
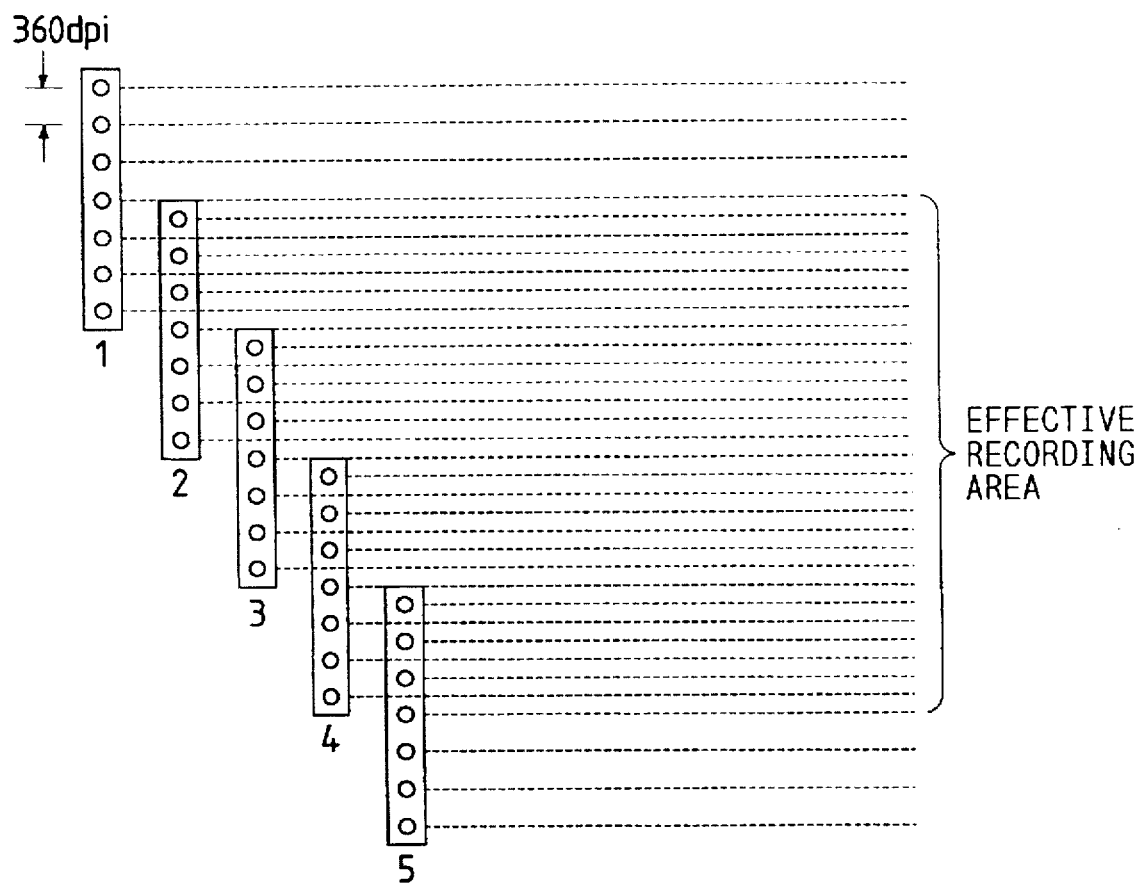
FIG. 13 is a chart showing the scanning of the recording head in the example 6.

FIG. 13 is a chart showing the scanning of the recording head in the example 6. This chart represents the number of scans and the recording area of the recording head to implement the recording at a resolution of 720 dpi with the recording head having a resolution of 360 dpi pitch.

STEP 70 is a step of processing black image data which is not the edge portion. The image data is transformed in accordance with the maximum ink shot rate N1 of black which is determined at STEP 64. The transformation process was performed by arithmetic operation as follows:

Dout=f(N1, Din)=Din×N1 where the input data before transformation is Din, the output data after transformation is Dout, and the transformation function is func.

STEP 71 is a step of processing color image data which is judged as the edge portion. Process 7 is conducted based on the maximum ink shot rate N2 of color. An example of process 7 is to effect recording at a resolution of 720 dpi which is twice the resolution of original image by applying well known smoothing process to only pixels on the outermost contour of the edge portion. Further, it is transformed to data to be recorded with up to two ink droplets in the minimum recording pixel at a resolution of 360 dpi. The reason why less ink droplets are provided than in the black processing of process 6 is that the emphasis on the edge portion is reduced, and for the color, the ink is more likely to blur with the same process 6, because two colors of Y, M, C are superimposed in recording R, G, B.

STEP 72 is a step of processing color image data which is not the edge portion. The image data is transformed in accordance with a function func for the maximum ink shot rate N2. The transformation process was arithmetically operated by the following definition:

Dout=f(N2, Din)=Din×N2

It is noted that the transformation functions for black and color are the same, but may be different.

At STEP 73, to integrate image data processed at each step from STEP 69 to STEP 72, the logical sum of each data is calculated, and binarized for the transformation into binary image data. Herein, the binarization process used the error diffusion method, but may be any other methods.

STEP 74 is a step of confirming image data binarized, and transforming it into recording data for driving the recording head of the recording apparatus.

Herein, STEP 66 relies on a judgment whether image data is black or color, but may be other judgment. Or other judgment may be added and performed independently. For example, the image processing condition may be changed for every object or image size. Specifically, "character data or graphic data" or "others (natural image data)", or "bit image data" or "others", etc. Also, by detecting the character size concurrently with the edge, the condition of process 6 for the edge portion may be changed in accordance with the character size. Since the collapsed character is likely to occur due to data variation in the relatively small character, the edge enhancement process may be applied to only one pixel from the edge portion, while for the relatively large character of 12 points or greater, the enhancement process may be performed on several pixels from the edge portion to raise the line density conversely.

For the enhancement, the processing may be selected for the purposes of the image quality and recording speed to be obtained.

While this example was described in connection with the case wherein 8-bit image data was input, this example is similarly applicable to binary image data, and in the case of binary image data, it is possible that the binary data is transformed into multi-value data by, for example, the multi-value transformation process at STEP 65, and then the above processing is performed. Also, when the binary/multi-value transformation is not performed, the edge detection or thinning may be performed by a pattern processing having a mask size of e.g., 16×16.

[EXAMPLE 7]

Figure 14:
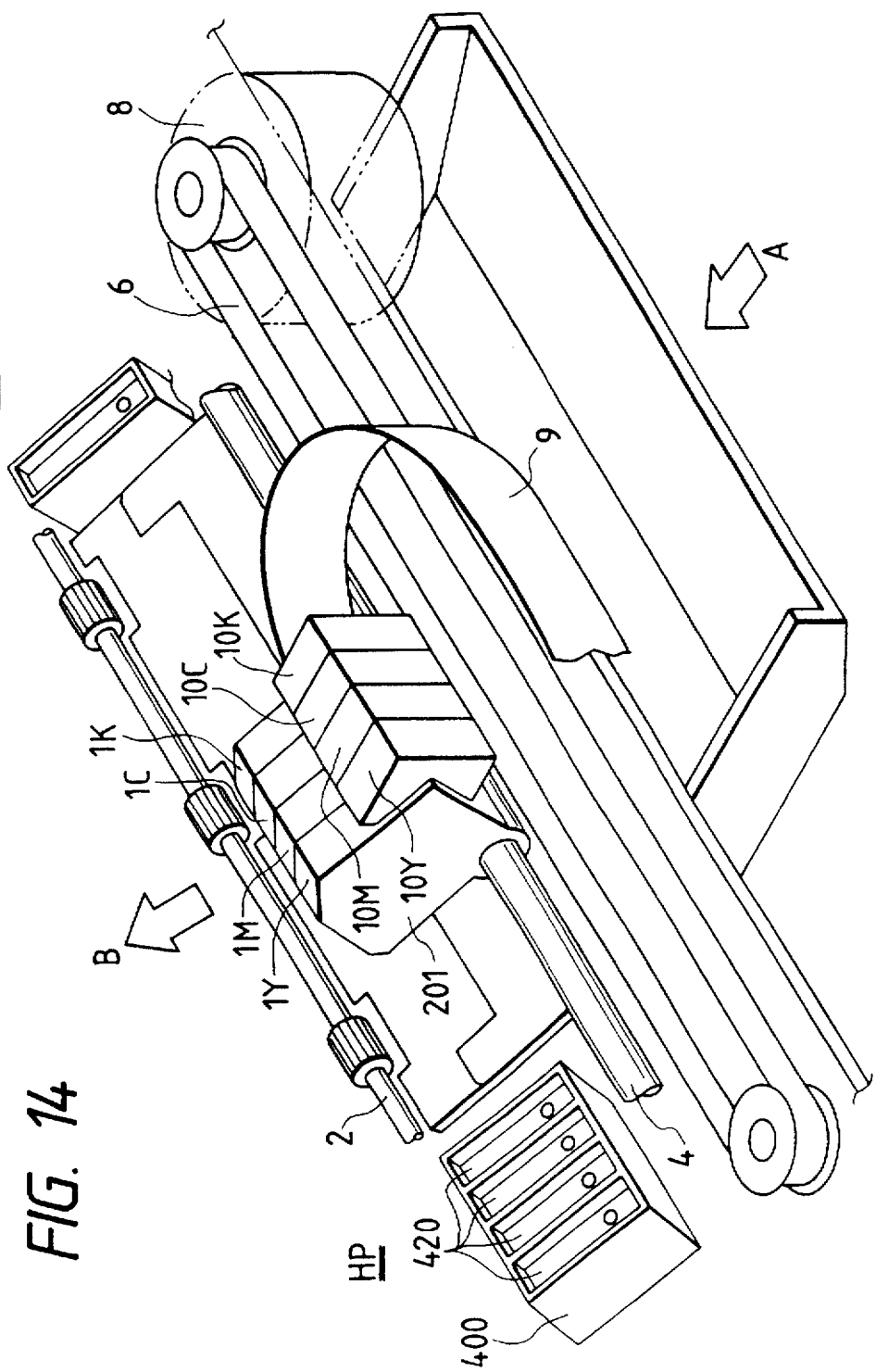
FIG. 14 is a perspective view of a recording apparatus in an example 7.

FIG. 14 is a perspective view of a recording apparatus in an example 7, illustrating a serial-type ink jet color printer to which the present invention is applied.

A print head 1 has a series of nozzles and is a device for recording image through the dot formation on the recording medium by discharging ink droplets. In this example, piezoelectric elements which are electromechanical converters are employed to positively create ink droplets of different sizes (i.e., different ink discharging amounts). By controlling the voltage value to be applied to the piezo-electric elements, it is possible to discharge the ink of different discharging amount from the same nozzle. Also, different color ink is discharged from different print head, so that color image is formed on the recording medium by the color mixing of ink droplets. A series of print heads of 1K (black), 1C (cyan), 1M (magenta) and 1Y (yellow) are mounted on a carriage 201 to form image on the recording medium in the same order during one scanning in one way.

A carriage 201 is moved on a slide shaft as the motive power from a carriage driving motor 8 is transmitted via belt 6. The printing in row direction is performed during movement in this main scan direction. A recovery unit 400 has a function of maintaining the condition of print head always excellent, such that a series of caps 420 encloses the discharge face of the print head during non-printing state to prevent drying. Therefore, the position at which the carriage 201 faces the recovery unit 400 is referred to as a home position (hereinafter HP). In the normal printing operation, the carriage is moved from this HP to effect printing, such that the printing is performed from left to right in FIG. 14 in this example. In the sub-scan direction, the recording medium is fed by a paper feeding motor, not shown. In the same direction, the A direction is a paper feeding direction. Reference numeral 9 is a flexible cable for supplying electric signal to the recording head. Also, the ink supply is made from ink cassettes 10K, 10C, 10M, 10Y mounted on the carriage 201. The supply of ink is not limited to the constitution as shown, but may be configured to supply the ink for each color from the ink tank provided on the main body of recording apparatus via tubes for the ink supply, like the flexible cable, to the print head on the carriage.

Figure 15:
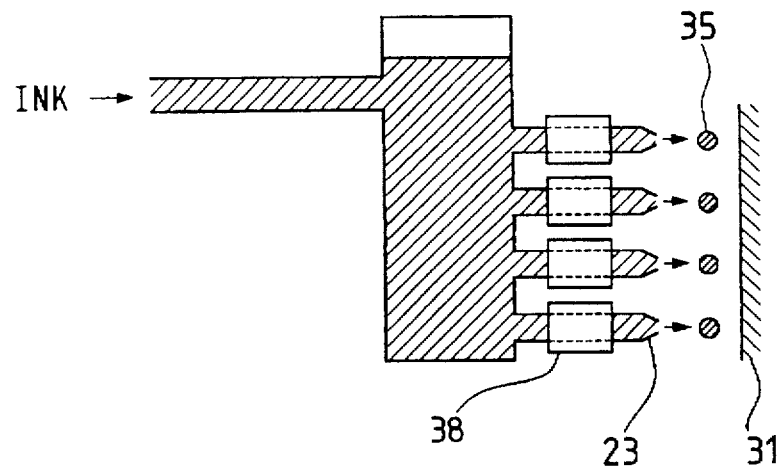
FIG. 15 is a view showing the details of another recording head to which the present invention is applicable.

FIG. 15 shows the details of the recording head as shown in FIG. 14. The recording head is of the constitution using electrothermal converters, as described in Japanese Laid-Open Patent Application No. 63-237669. Two sorts of ink volume can be obtained by using the piezo-electric element 38 which is an electromechanical converter and changing the driving condition for driving the piezo-electric element. By the drive condition is meant the condition for varying the driving energy by controlling the voltage value or driving time, or alternatively controlling the waveform for driving.

Figure 16:
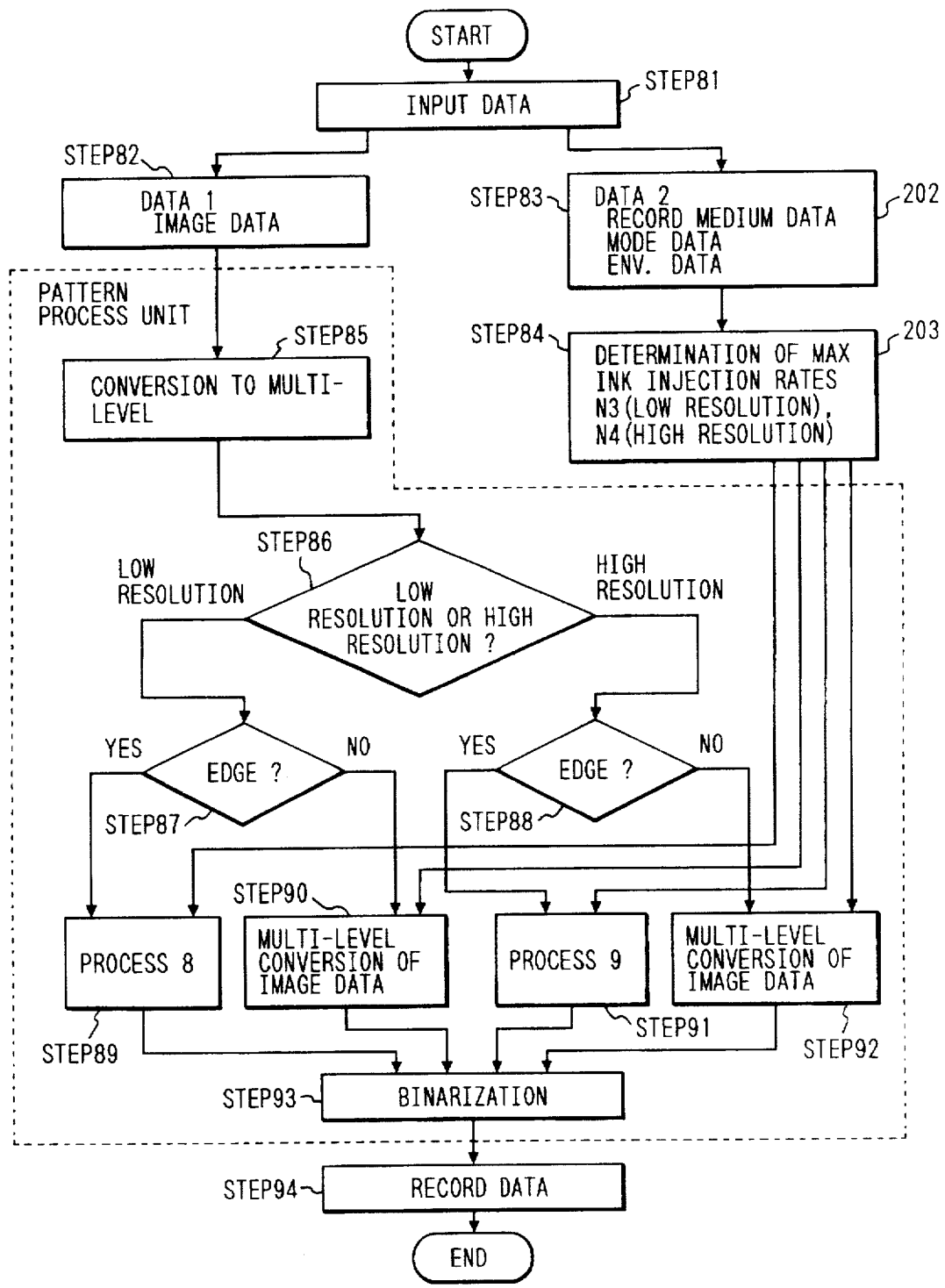
FIG. 16 is a flowchart wherein ink droplets of different volumes are used.

FIG. 16 is a flowchart in the case of using ink droplets of different volumes. In a fast recording mode, the recording is performed at a resolution of 360 dpi, with the discharge volume per dot being 50 ng. On the other hand, in a high quality recording mode, the recording is performed at a resolution of 720 dpi, with the discharge volume per dot being 30 ng. The recording operation at a resolution of 720 dpi relied on a method as shown in FIG. 13.

At STEP 81, input data is divided into data 1 which is image data and data 2 which is control data, and the operation goes to the next step.

At STEP 82, image data is divided into recording information and resolution information, and the recording information is sent to the pattern processor. Also, the resolution information is sent to STEP 84.

STEP 83 is a step by control data determining means 202. Data 2 which is control information for the recording apparatus during the recording which is determined by recording medium data, mode data and environmental data is sent to the pattern processor.

STEP 84 is a step by maximum ink shot rate determining means 203. The maximum ink shot amount N3 at low resolution and/or the maximum ink shot amount N4 at high resolution can be determined by resolution information and control information. When the resolution information is high resolution, the high quality recording mode is set automatically. Since the discharging volume per dot is different between the fast recording mode and the high quality recording mode, the maximum ink shot amount is required to be independently set.

Then, the pattern processor surrounded by the dot line performs a processing to obtain the optimal recorded image from the respective conditions for data 1 and data 2.

STEP 85 is a step of multi-value transformation process. When the recording information is binary, the binary data is transformed into multi-value data, while when the recording information is multi-value data, the operation goes directly to the next step.

At STEP 86, a determination is made whether the resolution is low or high, based on the resolution information of image data. In the case of low resolution, the operation goes to STEP 87, while in the case of high resolution, the operation goes to STEP 88.

STEP 87 and STEP 88 are steps of judging whether image data is edge portion or not. At STEP 87 and STEP 88, a well known edge detection process was performed in this example.

STEP 89 is a step of processing the low resolution data which is judged that image data is the edge portion, and performs process 8. An example of process 8 includes performing well known smoothing process on the edge portion.

STEP 90 is a step of processing low resolution data which is not edge portion. Based on the maximum ink shot rate N3 at low resolution which is determined at STEP 84, the image data is transformed into the recording information. The transformation process is performed by an arithmetical operation defined as follows:

Dout=f(N3, Din)=Din×N3 where the input data before transformation is Din, the output data after transformation is Dout, and the transformation function is func.

STEP 91 is a step of processing high resolution data which is judged as the edge portion, for which process 9 is conducted. An example of process 9 is a well known smoothing process on the edge portion.

STEP 92 is a step of processing high resolution data which is not edge portion. Based on the maximum ink shot rate N4 at high resolution which is determined at STEP 84, image data is transformed into the recording information. The transformation process is performed by an arithmetical operation defined as follows:

Dout=f(N4, Din)=Din×N4 where the input data before transformation is Din, the output data after transformation is Dout, and the transformation function is func. The transformation function is the same herein for the low resolution and the high resolution, but this function may be different.

STEP 93 is a step of integrating image data processed at each step from STEP 89 to STEP 92. Also, image data is transformed into binary form through the binarization process. Herein, the binarization process relies on a well known error diffusion method, but other methods may be used. At STEP 94, image data binarized is confirmed and transformed into recording data for driving the recording head of recording apparatus.

While the method for providing different ink discharge amounts was described with the recording head of using the piezo-electric element which is an electromechanical converter, other methods may be employed. For example, a bubble jet recording head using two electromechanical converters may be satisfactory.

Figure 17:
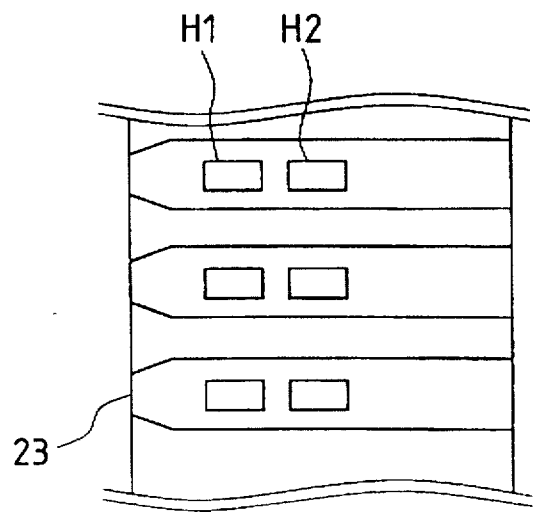
FIG. 17 is a cross-sectional view of a recording head in which the ink discharge amount is changed.

FIG. 17 is an enlarged front view near the electrothermal converter of a bubble jet recording head for providing different ink discharge amounts. The heat generator 30 which is an electrothermal converter of the recording head is composed of two heating elements H1, H2 which can generate the heat independently for each of all the nozzles. When recording at low resolution in the fast recording mode, the recording is performed at a recording density of 360 dpi. At this time, H1 and H2 corresponding to each discharge orifice are energized at the same time. Also, when recording at high resolution in the high quality recording mode, control is made so that H1 or H2 for each nozzle is only energized, wherein the volume of ink droplets for each color to be discharged is smaller than when recording at low resolution. A recording head system of changing such discharge amount in accordance with the resolution can exhibit the effects of the present invention effectively and remarkably.

[EXAMPLE 8]

Figure 18:
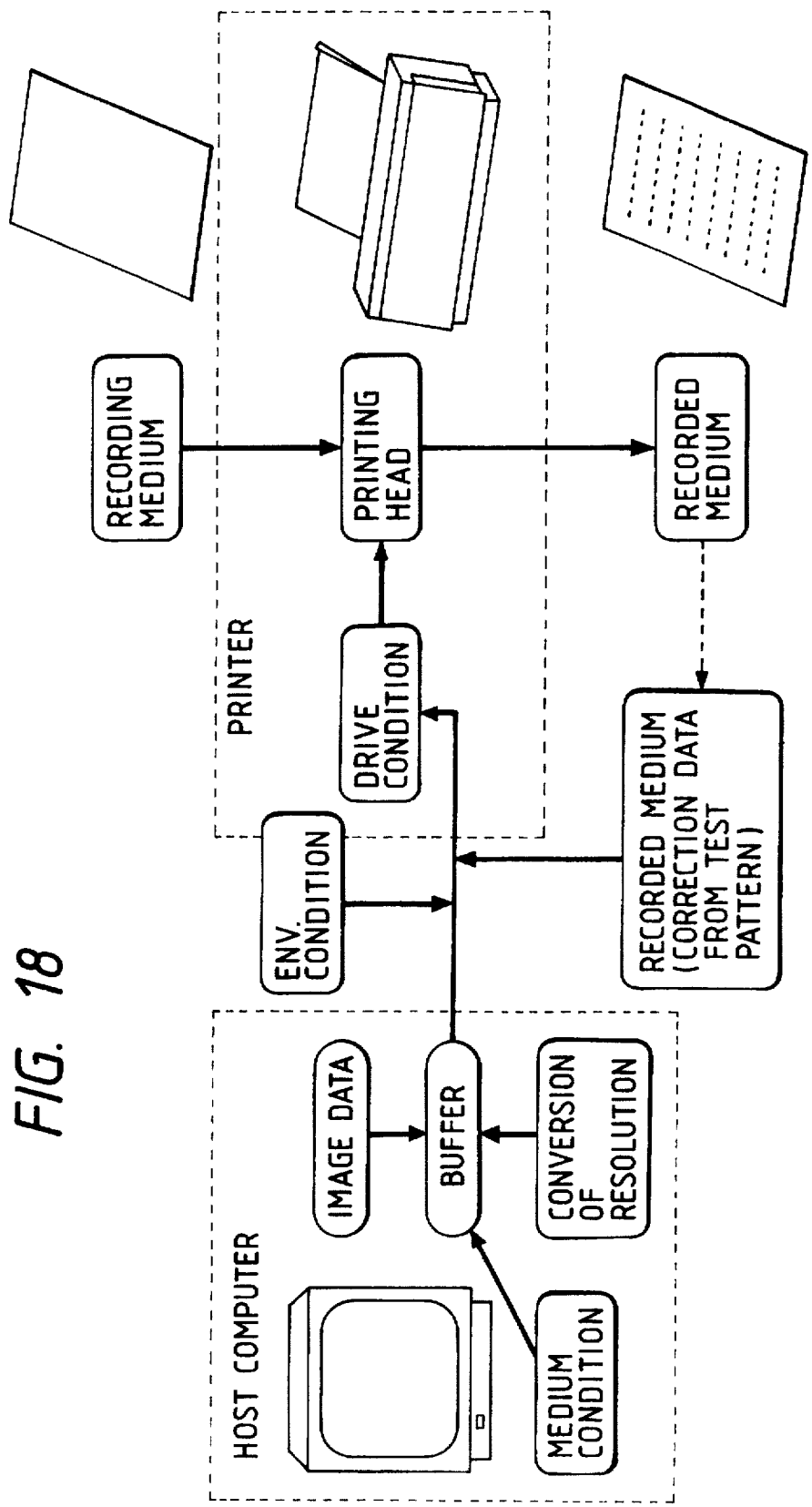
FIG. 18 is a diagrammatical view showing a system of an example 8.
Figure 19:
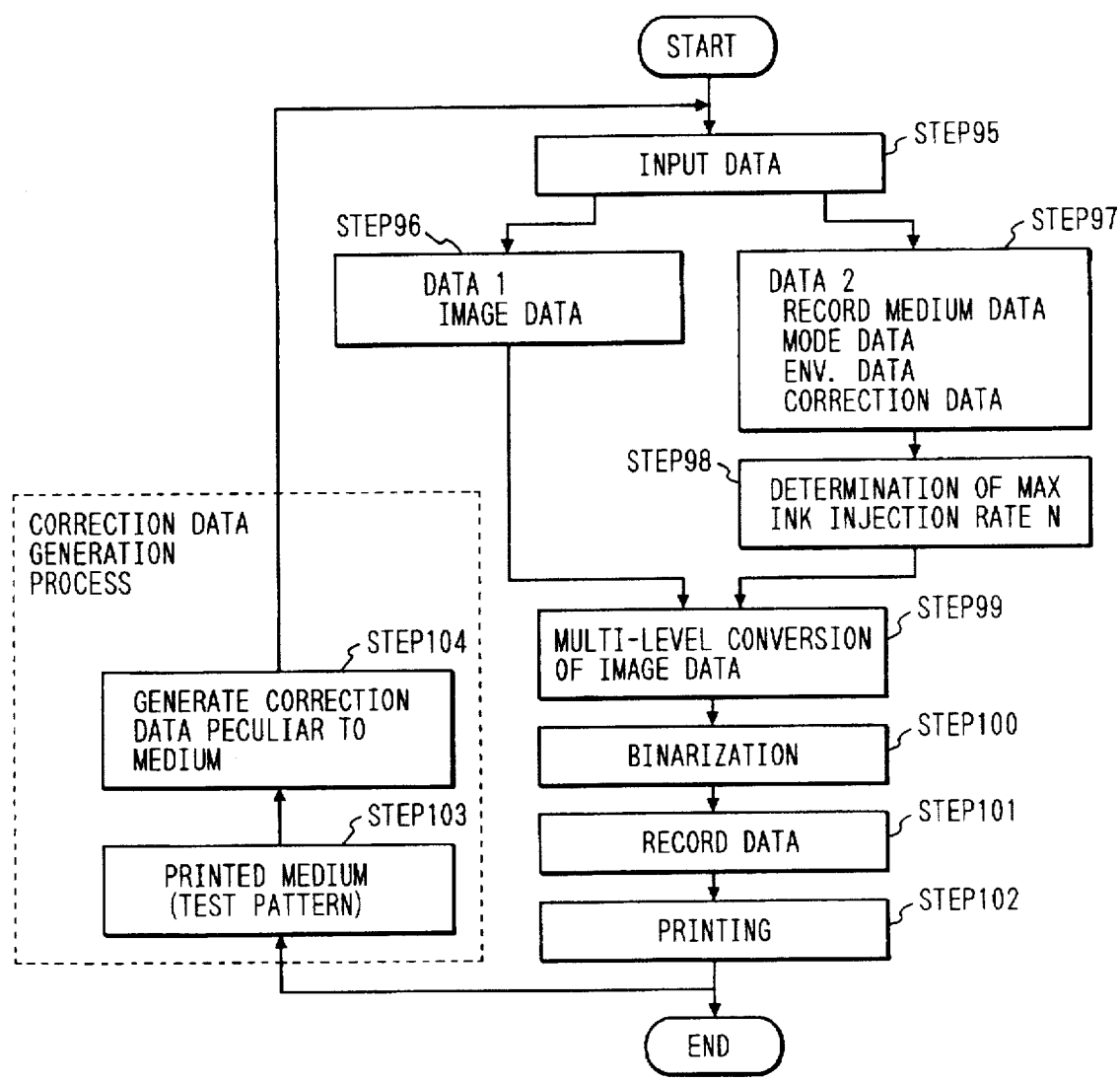
FIG. 19 is a flowchart for the example 8.

FIGS. 18 and 19 shows an example of an ink jet recording apparatus which is capable of recording at m resolution using an ink jet recording head of n resolution (m>n), characterized by comprising means for making the test print on a predetermined recording medium under the set driving condition where ink droplets (ink volume×number) are discharged in a range not exceeding the maximum ink shot amount per unit area of the predetermined recording medium, in accordance with m resolution, and means for modifying the set driving condition in accordance with the test print image. This example also involves an ink jet recording method (STEP 95 to STEP 102) for effecting the recording with m resolution (m>n), using the ink jet recording head of n resolution as in each example previously described, characterized by comprising a step of transforming input data into multi-value data, a step of setting the print mode in accordance with the resolution, a step of creating binary data for recording in accordance with the transformed multi-value value data and the set print mode as well as setting the driving condition where ink droplets (ink volume×number) can be discharged in a range not exceeding the maximum ink shot amount per unit area of the recording medium in accordance with the recording condition including the resolution and the recording medium and the driving condition, and a step of performing the recording by forming the ink droplet image of the size according to m resolution under the driving condition on the recording medium, using the binary data for recording, the description herein principally regarding the test mode.

In FIG. 19, the print is automatically performed as the predetermined input data is transferred, wherein the image quality can be further enhanced by judging the image on the recording medium (possibly using well known automatic or manual head shading). The apparatus constitution may be judged prior to shipping the apparatus, or with the user's operation, judged by printing a predefined test pattern on the same recording medium under the conditional recording of m, n resolution.

In any way, this example can resolve the problem of the present invention from many aspects sides, because it can preclude many variation factors in driving the recording head. Also, if this test print is performed immediately before high resolution recording to correct for the condition, variation factors in the recording apparatus or recording head and the use medium can be canceled out, so that higher resolution recording can be attained with higher quality.

(EXAMPLE 9)

Figure 20:
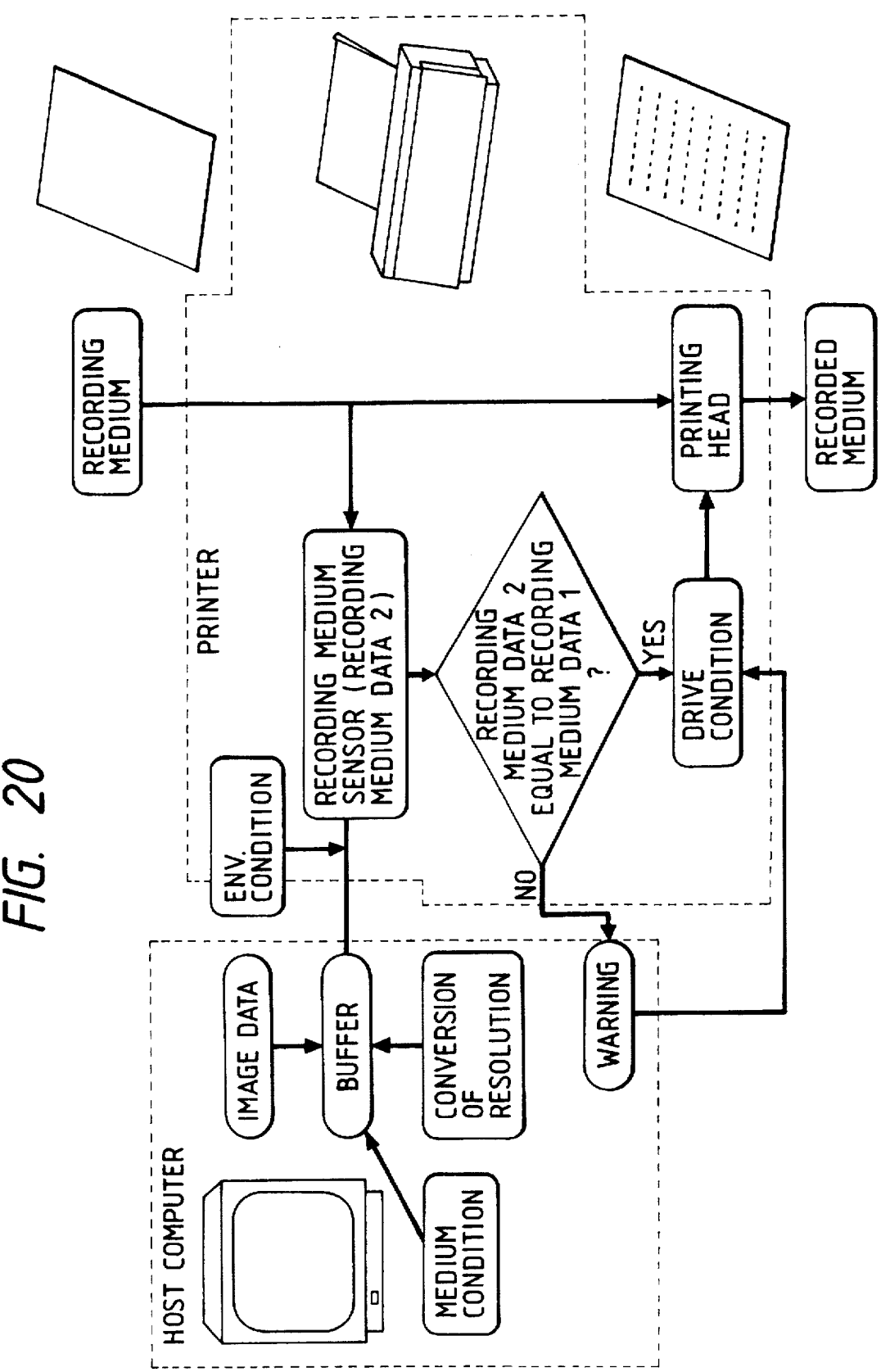
FIG. 20 is a diagrammatical view showing a system of an example 9.
Figure 21:
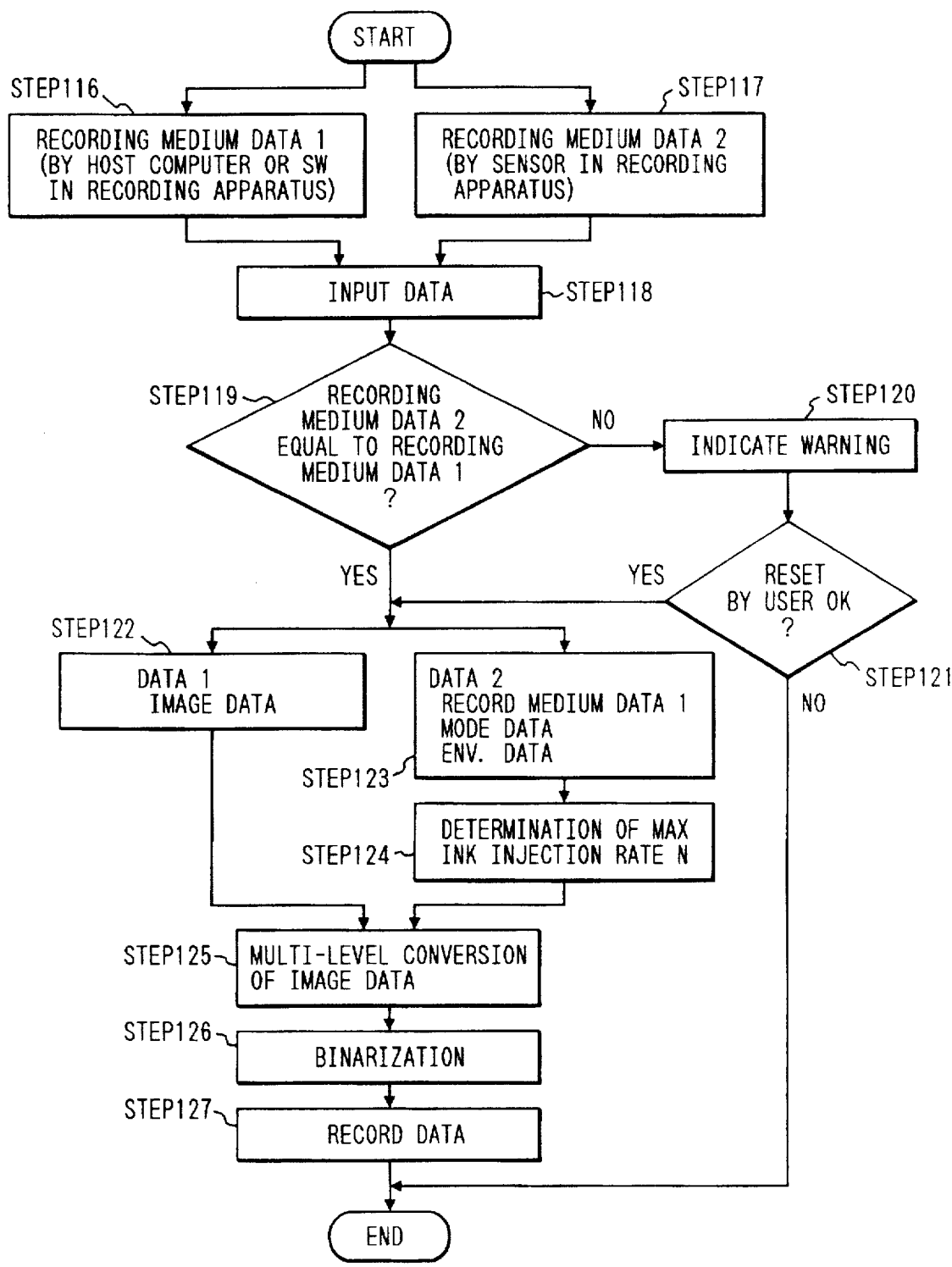
FIG. 21 is a flowchart for the example 9.

FIGS. 20 and 21 are an improvement over the example as shown in FIGS. 18 and 19. Fundamentally, the recording medium appropriate for the change of resolution is preset, and except for this recording medium, a warning message appears at STEP 120, indicating that high resolution recording can not be fully carried out. Or this example discloses a step of permitting high resolution recording on the recording medium except for the designated recording medium upon the warning release input from the user at STEP 121. The description herein is given only to the characteristic portion. This example can be also configured such that when the recording medium usable for the test print is preset in the system, a warning will appear if different recording medium (selected by the user) is provided.

The previously-described ink jet recording method is shown from STEP 122 to STEP 127 in FIG. 21. Judgment means of the recording medium as the sensor within the recording apparatus relies on the detection of various sorts of well known marks or the optical detection. In this way, the printing can be performed without waste and the higher recorded image quality for the apparatus can be assured, as the recording medium usable for the recording is confirmed beforehand.

(EXAMPLE 10)

Figure 22:
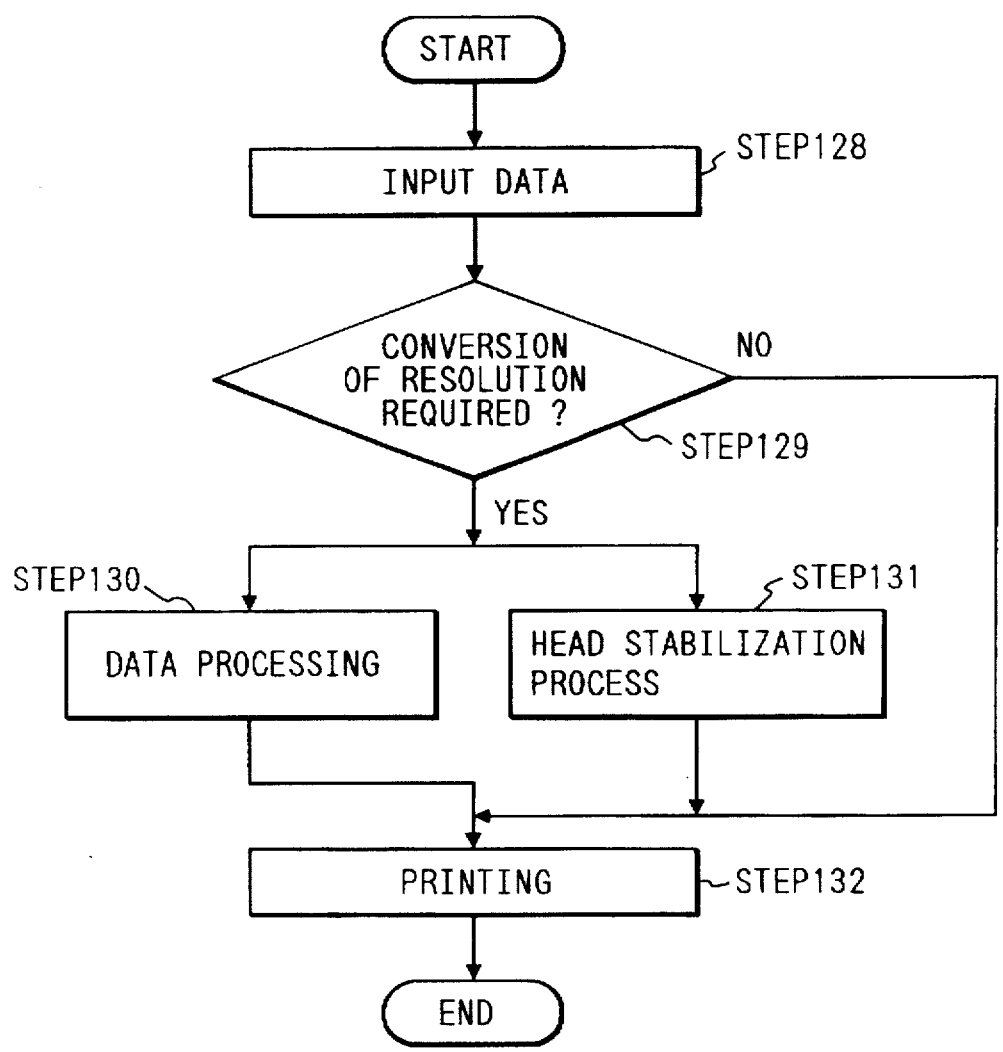
FIG. 22 is a flowchart for the essence of an example 10.

FIG. 22 shows an example of an ink jet recording apparatus which is capable of recording at m resolution, using an ink jet recording head of n resolution (m>n), characterized by comprising means for effecting the recording in accordance with the resolution by changing the recording medium or the recording head driving condition, and means for stabilizing the recording head in accordance with the change of the resolution, with a flowchart applicable to the recording apparatus of FIG. 1.

At STEP 129, a determination is performed whether or not resolution transformation is necessary, and if necessary, a head stabilization processing is performed at STEP 131, and the data is transformed in accordance with the resolution. In this way, performing the head stabilization process allows the head state suitable for the resolution to be attained timely, so that the ink jet recording method (STEP 95 to STEP 102) of the present invention can be made more effective. The ink jet recording method has a step of performing the recording head stabilization process (e.g., cleaning on the head surface or predischarge, suction recovery or pressure recovery) according to the resolution transformation prior to the recording at m resolution in changing the mode from the n resolution to the m resolution, whereby ink droplets for the high resolution can be provided in high accuracy, and enhanced image quality can be assured. Particularly, when relatively small ink droplets for the high resolution are employed, especially remarkable effects can be expected.

(EXAMPLE 11)

In the example 1, a process of transforming the multi-value level for the recording into lower level (hereinafter referred to as "data transformation process") was performed, when exceeding the maximum ink shot amount for all the input data. Therefore, there is a possible drawback in attaining the recording at the highest density because the output level near the maximum value of the multi-value level of input data is lower.

Thus, in this example, the output level except near the maximum value of the multi-level of input data is lowered below the input level. Near the maximum value, the output level remains at the multi-value level of input data, or is lowered at a rate of not less than the lowering rate of input level exept near the maximum value. The above-mentioned problem is resolved through a process (hereinafter referred to as "data transformation (or conversion) process B").

Figure 23:
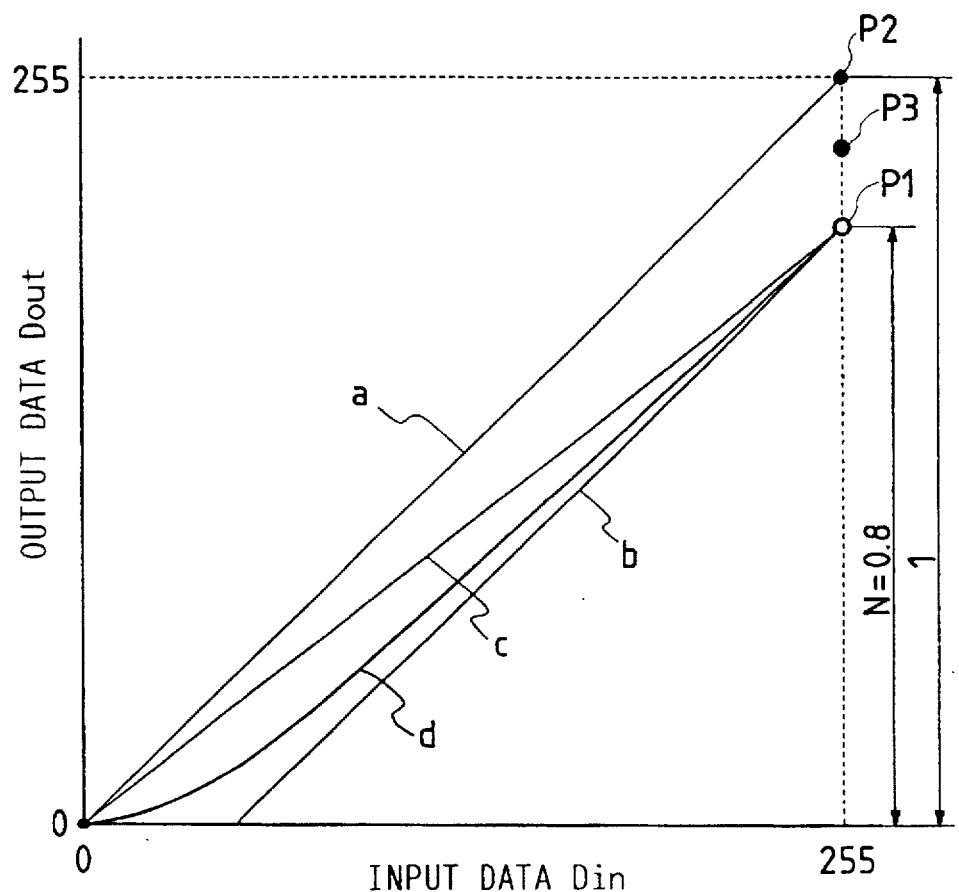
FIG. 23 is a chart showing an image data transformation process which is applicable in an example 11.

FIG. 23 is a chart showing a specific image data transformation process of the example 11. This process transforms input data Din of 8 bits with 256 gradations into output data of 8 bits with 256 gradations through a typical gamma transformation (or conversion). This example is one in which the recording paper is replaced with the specified plain paper from the reference recording condition as above mentioned, wherein N=0.8. The volume of one ink droplet to be discharged is controlled to be constant at 50 ng. In the color recording, a total of 100 ng is placed in a unit area of 360 dpi square, because the secondary colors R, G, B are represented by superimposing Y, M, C on one another. This is the case with N=1, but if N=0.8, this amount is too much. Thus, the data transformation process A which decreases the output data Dout with respect to the input data Din is performed to reduce the average ink discharge amount per unit area. For example, the straight line indicated by b is a transformation function.

However, only when the input data Din is at the maximum level or 255, the output data Dout is 255 identical to the input data. This processing, unlike the data transformation process A, is the data transformation process B. This example has the point in that only the maximum value of input data Din is processed differently from others.

As a result, the data transformation function is the straight line as indicated by b in FIG. 23, with the maximum value only being not P1 indicated by the white circle but P2 indicated by the black circle. When the input data Din is at the maximum level, the recording occurs at the high density although there is overflow of the ink on the recording medium. However, if the overflow is too much beyond the permissible range, the output data is not at the maximum level or 255 (P2), but at P3 between P1 on the extension from the transformation function of "data transformation process A" and P2, when the input data Din is at the maximum level or 255. P3 is a larger value than P1.

With the effects of this data transformation process B, the gradation image such as a landscape picture results in excellently gradated image, while the graphical image results in especially higher density, whereby the optimal processing for the recorded image was effected.

It is noted that the transformation function for transforming the multi-value level of image data is not the straight line as indicated by b in FIG. 23 and described heretofore, but may be a transformation function of multiplying input data Din by a constant value (which is determined depending on N), such as for example, the straight line as indicated by c. It is also the same that only the maximum value of Din occurs at P2.

Further, the transformation function for transforming the multi-value level of image data is not a linear transformation function as indicated by b or c, but may be a monotone increasing function as indicated by d. It is also the same that only the maximum value of Din occurs at P2.

In any way, in the data transformation process, when the input data Din is from 1 to 254, Dout is subjected to "data transformation process A" of lowering the multi-value level for the transformation into recording data in a range not exceeding the maximum ink shot amount per unit area in accordance with at least the recording resolution and the recording medium. Also, when the input data Din is at the maximum level or 255, Dout is subjected to "data transformation process" which is different from the "data transformation process A".

Further, the "data transformation process B" which is different from the "data transformation process A" is not only performed when the input data is at the maximum value or 255, but also may be extended to near the maximum value.

Figure 24:
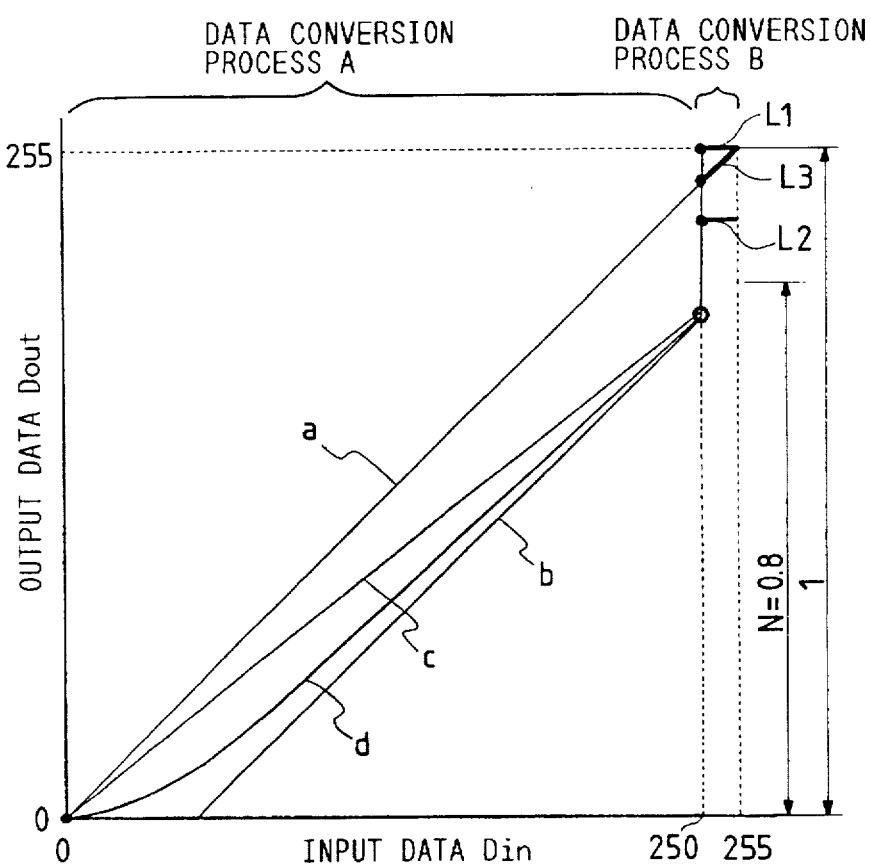
FIG. 24 is a chart showing another image data transformation process which is applicable in the example 11.

FIG. 24 shows an example of making the "data transformation process A" when the input data is from 1 to 249, and the "data transformation process B" when the input data is near the maximum value, or from 250 to 255.

The function for "data transformation process B" consists of L1 which is always at the maximum value, L2 which is a constant value, and L3 along which input and output are equivalent. In any case, the transformation ratio is smaller than that of "data transformation process A".

Through this process, the portion having relatively higher density is recorded more densely, while the portion having relatively lower density is recorded less densely, so that the recording without ink overflow is enabled.

Further, "data transformation process B" may be performed only for the edge portion of recorded image. This prevents overflow of the ink which is more likely to occur when the recording is performed on the evenly wide area through a processing of recording the portion with relatively higher density more densely, resulting in a merit that the edge portion can be recorded densely.

Further, this "data transformation process B" may be performed on "Bk", "character" or "Bk character".

This is particularly because the record of Bk, character or Bk character is visually more conspicuous than others, but other records are not remarkable.

(EXAMPLE 12)

In this example, in the low resolution mode with n resolution e.g., 360 dpi, the level transformation for the multi-value data is not performed, while in the high resolution mode with m resolution, e.g., 720 dpi, the data transformation processes A, B as described in the example 11 are performed. Thereby, in the high resolution mode in which overflow of the ink is more likely to occur, this is prevented, and the relatively dense portion can be recorded at high density.

If the data transformation process B is only applied to the edge portion of recorded image, the reduced density at the edge portion can be prevented. Also, the data transformation process B may be only applied to "Bk", "character" or "Bk character". The portion to which the data transformation process B is applied may not have reduced density even in the high resolution mode.

Each data process of the present invention is normally performed by data processing means within the recording apparatus, but is not limited thereto. For example, a part of processing may be performed in the host computer located outside the recording apparatus.

With the examples 1 to 12, it is possible to make high quality recording without blur which is suitable for the input data or recording medium at the time of resolution transformation, whereby the high resolution or high gradation recording is enabled. According to the present invention, it is possible to provide an ink jet recording method and recording apparatus which can effect the high quality recording in accordance with various kinds of recording media including the plain paper, irrespective of various input image data or recording conditions.

Further, with each of the examples as heretofore described, the recording can be effected at higher resolution than ever before.

(EXAMPLE 13)

An ink jet recording apparatus of this example is applicable to the apparatus as shown in FIG. 1 and described in the example 1.

The enlarged cross-sectional view near the electrothermal converter of the recording head is as shown in FIG. 3 which is previously referred to, and the enlarged front view near the electrothermal converter of the recording head is as shown in FIG. 17 which is previously referred to.

In the recording at the normal low resolution, the recording is performed at a recording density of 360 dpi. When the ink is discharged at this time, H1 and H2 corresponding to each discharge orifice are heated at the same time. The ink within each of the nozzles which is rapidly heated due to the heat of H1 and H2 forms a bubble owing to film boiling, and an ink droplet 35 as shown in FIG. 3 is discharged onto the recording medium owing to a pressure of creation of the bubble, so that the character or image is formed on the recording medium. Herein, the volume of ink for each color to be discharged is about 40 ng.

On the contrary, in the recording at the high resolution, only H1 for each nozzle is controlled to be heated, the volume of ink droplet for each color to be discharged is less than in the recording at the low resolution or about 20 ng.

In this way, the high resolution recording was performed using a recording head which can discharge the ink of different volume through the same nozzle, only with the ink of smaller volume. The discharge of the ink of different volume is allowed by, in addition to the use of two electrothermal converters for each nozzle in the above manner, for example, controlling the power to be applied to the electrothermal converter in discharging the ink, or controlling the ink temperature, wherein the present invention is effective for either method.

Herein, in each example, the volume of ink droplet for each color to be discharged is about 40 ng, when recording at 360 dpi which is the normal low resolution, while the volume of ink droplet for each color to be discharged is about 20 ng, when recording at the high resolution. The reason thereof will be shown below.

This has been determined because the average maximum ink absorbing amount per pixel at 360 dpi in the plain paper is about 80 ng. In recording the secondary colors red (R), green (G) and blue (B), two ink droplets of Y, M, C are mixed. Therefore, the volume of ink droplet for each color is half the maximum absorbing amount or about 40 ng so as not to cause any overflow on the plain paper.

Then, in recording at the high resolution of 720 dpi, the ink volume per dot is essentially reduced to one-fourth that of recording at 360 dpi or 10 ng, whereby four dots should be recorded in the area of one dot when recording at 360 dpi. However, it is considerably difficult that ink droplets of about 10 ng, which is equal to one-quarter the normal quantity, can be stably discharged at the desired timing in the desired recording area, and the multi-nozzle recording head with a plurality of nozzles arranged can be mass-produced cheaply. This is because the productivity is lowered due to the required precision process of nozzles or the clogging by fine dirt. Further, the consistency of discharging ink droplets of about 40 ng in the normal recording and discharging ink droplets of about 10 ng in the high density recording is technically difficult in the production technology in the state of the art, though the smaller volume of ink droplet having 20 ng is practically more feasible than the volume of ink droplet discharged having 10 ng, whereby with the application of the present invention, the high resolution recording with excellent image quality can be effected.

Also, if with the progress of the production technology in the future, a recording head capable of discharging ink droplets of smaller volume of 10 ng, or further 5 ng, stably can be produced, the higher resolution recording will be effected by applying the present invention.

The determination of the average maximum ink absorbing amount per unit area in the recording medium can be effected normally by designing the instance of recording the particular area evenly smeared out as the worst value. This is because the ink of evenly smeared portion can permeate only into the recording medium. On the contrary, the ink near the edge portion can overflow outside the recording area and permeate thereinto, and thus be excluded.

On the other hand, in recording the character or image, it is generally known that if its edge portion is recorded more densely, the image quality is enhanced.

Thus, attempts have been made to record the recording data, with the ink recording amount per unit area in terms of a unit area of 360 dpi square defined as 80 ng at maximum for the monochrome (160 ng for two colors) on the edge portion and 40 ng at maximum for the monochrome (80 ng for two colors) on the non-edge portion, whereby excellent results could be obtained.

Figure 36:
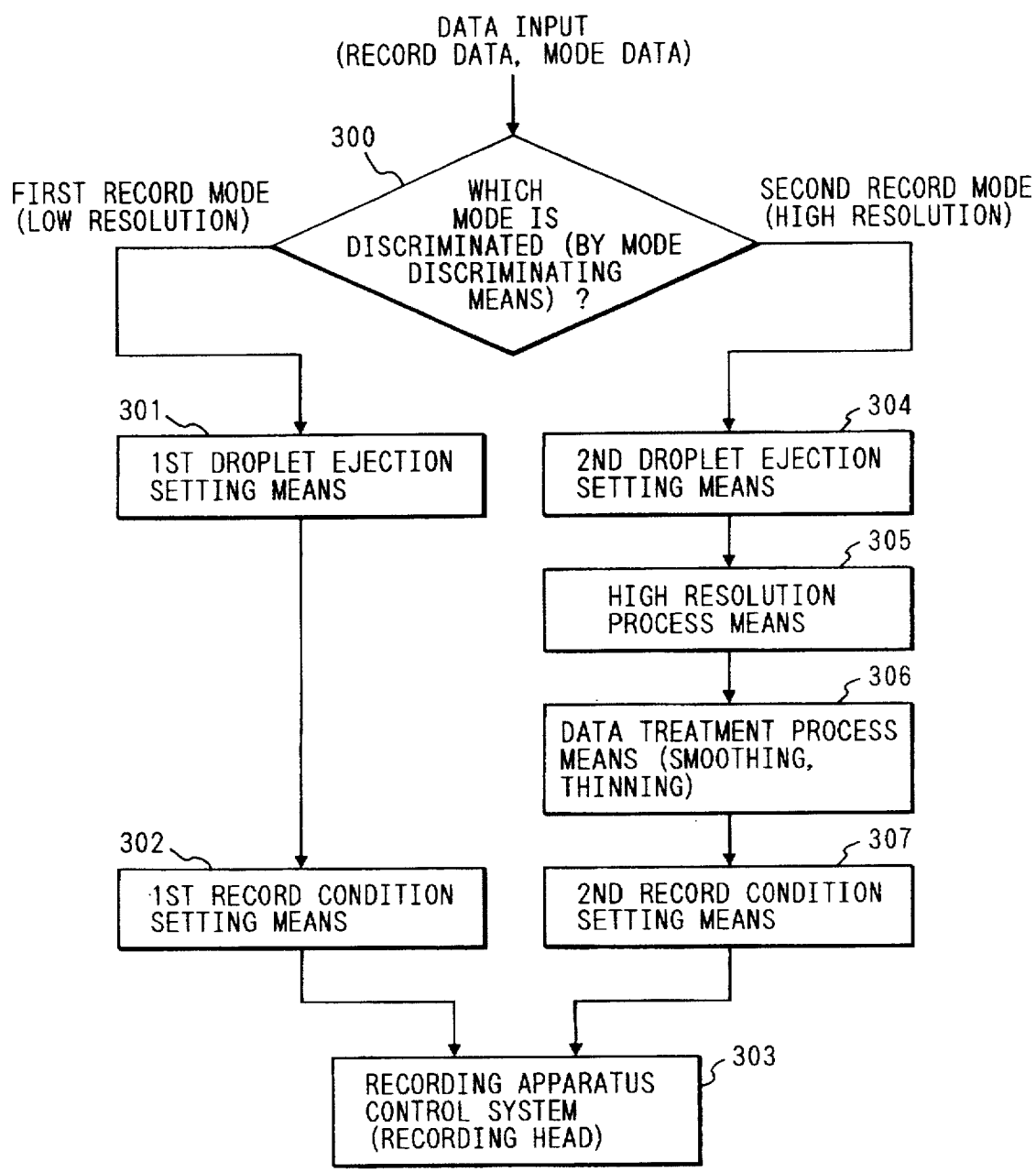
FIG. 36 is a flowchart showing the functional block in the example 13.

FIG. 36 is a functional block diagram of a recording apparatus in this example.

First, data is input into the recording apparatus. This data consists of recording data and control data for controlling the recording apparatus, as well as the mode data for determining the recording mode. By recording mode determining means 300, the first recording mode or the second recording mode is judged, based on the recording mode and the mode data from input data, and the mode setting according to it is made.

This determination permits a selection from the two options of manual selection and automatic selection in this example.

(1) Determination according to mode data determined by the user setting. Specifically, the user makes a selection on the panel of recording apparatus. Or the user makes a setting by means of a printer driver operating within the host computer. This can be set in a unit of page to be recorded.

(2) Determination by the automatic setting. Specifically, the following types are provided.

1. When input recording data has a resolution of 360 dpi or less, the first recording mode is effective in recording, while if there is high resolution data of 720 dpi, the second recording mode is effective. This mode is suitable in recording at the resolution faithful to the input data. This is favorable when emphasis is placed on the input image itself.

2. Only when the recording data is the character data, the first recording mode is effective in recording. This mode is suitable when it is desired to record the character at fast speed and the portion except for the character at high quality. The character is suitable to record for the purpose of reading, and the image is suitable to record for the purpose of viewing.

3. Only when the recording data is the character data, the second recording mode is effective in recording. This mode is suitable when it is desired to record the portion except for the character at fast speed and the character portion at high quality. This mode is preferable in obtaining the recorded matter where emphasis is placed on the quality of the character and having other image added.

4. Only when the recording data is the black character data, the first recording mode is effective in recording. This mode is suitable when it is desired to record the black character at fast speed and the other portion at high quality. The black character is suitable to record for the purpose of reading, and the other color character or image is suitable to record for the purpose of viewing.

5. Only when the recording data is the black character data, the second recording mode is effective in recording. This mode is suitable when it is desired to record the black character at high quality and the other portion at fast speed. This mode is preferable in obtaining the recorded matter where emphasis is placed on the quality of the character and having other image added.

6. Only when the recording data is the black data, the first recording mode is effective in recording. This mode is suitable when it is desired to record the black data at fast speed and the other portion at high image quality.

This case is further divided into two. One is when only the total recording area containing Y, M, C (also including Bk adjacent to C, M, Y) is recorded at high image quality, and the other is when only the Y, M, C data is recorded at high image quality. Either of them is preferable in recording when emphasis is placed on the color recorded image.

7. Only when the recording data is the black data, the second recording mode is effective in recording. This mode is suitable when it is desired to record the black data at high image quality and the other portion at fast speed.

This case is further divided into two. One is when only the total recording area containing Bk (also including Y, M, C adjacent to Bk) is recorded at high image quality, and the other is when only the Bk data is recorded at high image quality. Either of them is preferable in recording when emphasis is placed on the black recorded image.

8. Only when the recording data is the bit map data, the second recording mode is effective in recording. This mode is suitable when it is desired to record the bit map data at high image quality and the other portion at fast speed.

9. Only when the recording mode is the plain paper, the second recording mode is effective in recording. This mode is preferable to effect the recording in the optimal recording mode in accordance with the recording medium. Specifically, on the transparent (OHP) sheet, the first recording mode (low resolution) is effective. If the character or image recorded on the transparent (OHP) sheet is projected through an overhead projector, its resolution is not reflected even by the recording at high resolution. Accordingly, the recording may be made at low resolution, and thus at fast speed. In this case, for the practical operation, a recording medium judging sensor such as a photosensor is provided on the recording apparatus to effect the automatic judgment.

The mode is automatically set by each of them or the combination thereof.

The fast recording mode which is the first recording mode and the high quality recording mode which is the second recording mode have opposite features in the respects of recording quality and recording speed, whereby it is desirable to make a selection depending on the above purposes.

The range of mode setting can be set in a unit of page to be recorded. Also, it can be automatically changed according to the recording area within the same page. In this case, when the first and second recording modes are mixed within one page and within the same scanning of the recording head, the scanning of the recording head operates in the second recording mode which is the high resolution recording, wherein the second recording mode can cover the first recording mode.

In the first recording mode, first liquid droplet discharge setting means (or first droplet ejection setting means) 301 sets the volume of ink droplet to be discharged at 40 ng. Specifically, the use of the heating elements 30 (H1, H2) as already described is set. Then, first recording condition setting means 302 performs the first recording settings including the paper feeding amount, and recording data to be supplied to the heating elements 30 of the recording head.

In the second recording mode, second liquid droplet discharge setting means (or second droplet ejection setting means) 304 sets the volume of ink droplet to be discharged at 20 ng. Specifically, the use of either of the heating elements 30 (H1, H2) is set. Then, high resolution processing means 305 performs the high resolution transformation processing means 305 performs the high resolution transformation process. The details of this processing is described below. Subsequently, in data portion processing means (data treatment process means) 306, the smoothing process or thinning process as will be detailed later is performed. Subsequently, second recording condition setting means 307 performs the second recording condition settings including the paper feeding amount, and recording data to be supplied to the heating elements 30 of the recording head.

Finally, the recording data is transferred to a recording apparatus control system 303 including the recording head, to control the recording head and the carriage portion, as well as the line feed portion, in accordance with the recording data and the recording mode under the conditions set by the first and second recording condition setting means.

Herein, it is needless to say that the high resolution recording mode is necessary to obtain the high quality recording at high resolution, but the low resolution recording mode is also important. This is because the low resolution recording mode has faster speed, that is, results in shorter data processing time or scanning time of the recording head.

In this way, the point that the recording mode can be freely changed or set is extremely effective as the recording method.

Figure 26:
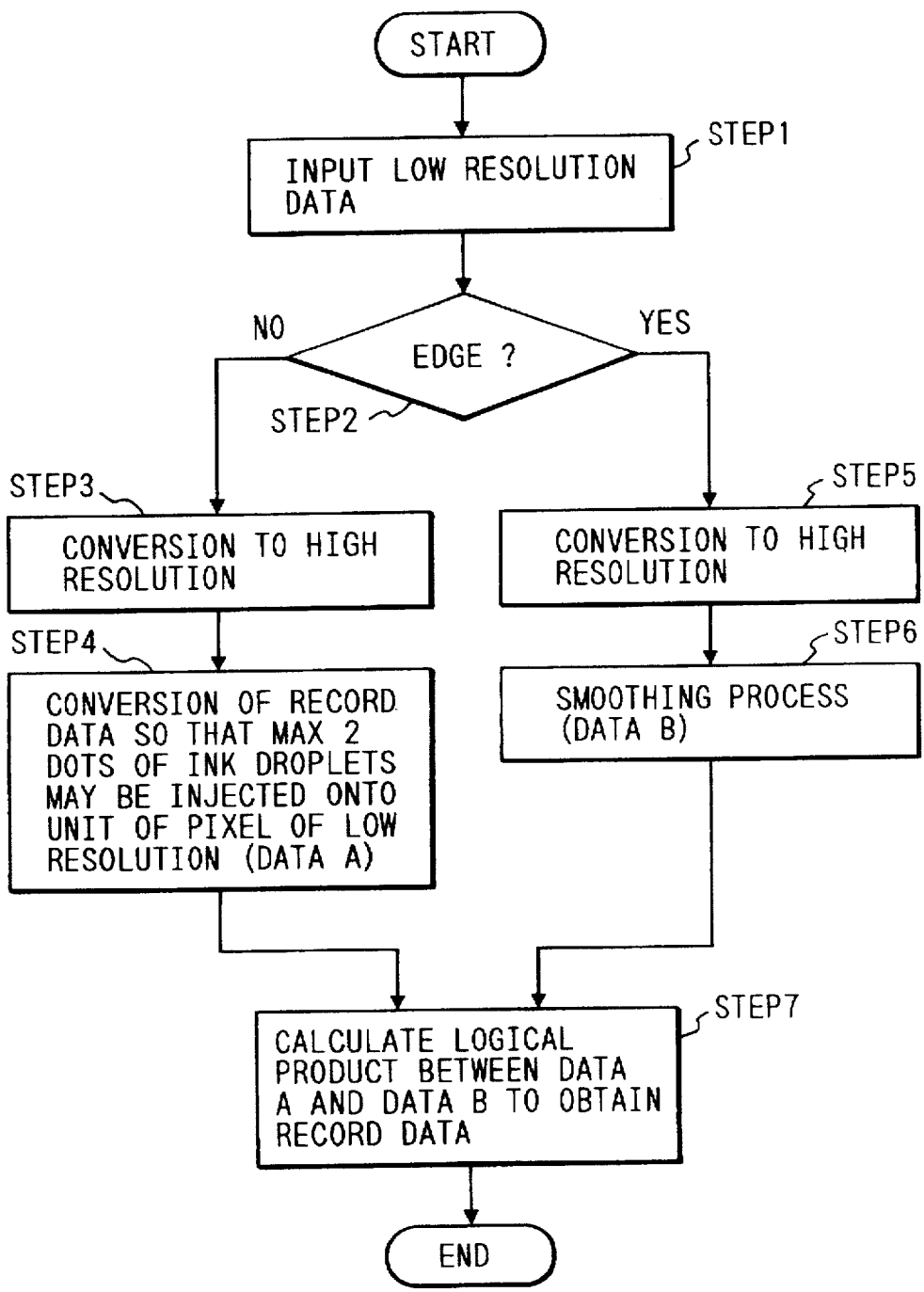
FIG. 26 is a flowchart of transforming input data into recording data.

FIG. 26 is a flowchart showing the processing of high resolution processing means 305 and data portion processing means 306 as shown in FIG. 36. More particularly, this is a flowchart in which when input data is the low resolution data which is at the first resolution, input data is transformed into the high resolution data which is at the second resolution, which is then subjected to smoothing and thinning. Also, FIGS. 29 to 32 are views illustrating the data transformation. With these views, the data transformation process is explained.

In this example, the low resolution which is the first resolution refers to the resolution of 360 dpi or less, while the high resolution which is the second resolution refers to the resolution of 720 dpi or less.

In FIG. 26, data is input at STEP 1. The data is in the low resolution of 360 dpi.

Figure 28:
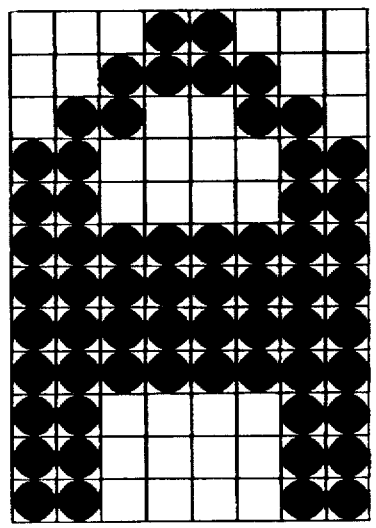
FIG. 28 is a view showing an original image of input data.

FIG. 28 shows input data of original image at low resolution. Black circle (●) is a dot for recording the character A. Note that this view is not the actual font, but typically shown for the explanation. Data of original image is recorded one dot in one pixel at a resolution of 360 dpi. Herein, the lattices extending lengthwise and breadthwise are shown at a resolution of 360 dpi that is, with the minimum recording pixel in a unit of 70.6 μm. This is the same with the following figures.

Figure 29:
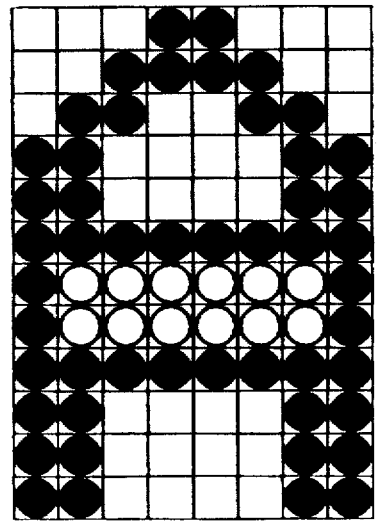
FIG. 29 is a view showing the edge portion of original image.

At STEP 2, the edge portion (edge area) of input data at the low resolution is detected. FIG. 29 shows data of original image of which the edge portion is detected. Black circle (●) indicates the edge portion, while white circle (○) indicates the non-edge portion. The detecting process for the edge portion relies on the judgment of whether or not recording data exists around the input data of notice at the low resolution. If no recording data exists therearound, the edge portion is judged, while if recording data exists, the non-edge portion is judged. If the edge portion is judged, the operation goes to STEP 5, or otherwise to STEP 3.

Figure 30:
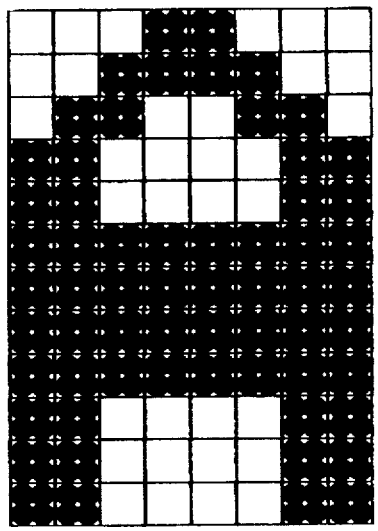
FIG. 30 is a view showing data transformed into high resolution.

STEP 3 is a high resolution process. FIG. 30 shows transformed data at 720 dpi from the original image. Data of one pixel at 360 dpi is simply replaced with four pixels at 720 dpi. STEP 4 is a thinning process (transformation), wherein for the input data of non-edge portion, the recording data is transformed so that ink droplets of color to be recorded in an area of 360 dpi square may be up to 2 dots. The simplest method is to thin diagonally data of two dots. Since the non-edge portion was essentially one-dot data, there is no inconvenience that all data to be recorded may be missed by this processing. Data for thinning obtained by this processing (thinning dot 0, other 1) is supposed to be data A. Then, the operation goes to STEP 7.

Figure 31:
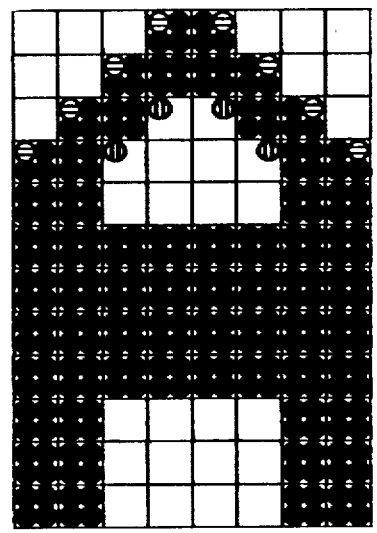
FIG. 31 is a view showing data which is smoothing processed.

STEP 5 is a high resolution transformation process, the processing content of which is identical to STEP 3. STEP 6 is a smoothing process. FIG. 31 is a view illustrating the smoothing process of data of FIG. 30. Herein, the smoothing process takes an algorithm of "cutting projection on the upper side and adding depression on the lower side". Cut data is indicated by the horizontal line, and added data is indicated by the longitudinal line. Data obtained herein is assumed to be data B.

STEP 7 is a step of combining data in the edge portion and data in the non-edge portion. Specifically, the logical sum between data A for thinning from the data which is not the edge portion and the smoothing data B which is the edge portion is taken to provide the recording data.

In the above, the ink recording amount per unit area in a unit area of 360 dpi square is:

1. For the edge portion in the original image, and the data portion added by smoothing process, 4 dots at maximum for each color, or 8 dots if two colors are permitted, that is 160 ng at maximum.

2. For the non-edge portion in the original image, 2 dots at maximum for each color, or 4 dots at maximum if two colors are permitted, that is, 80 ng at maximum.

Herein, the reason of using 4 dots or 2 dots at maximum for each color is the possibility of using less dots. In the former, this possibility may occur due to the edge processing or the smoothing process. Also, in the latter, this may be caused, when data of original image is multi-value data, owing to the processing of applying the recording ink evenly over the recording medium.

With the above processing, the edge portion was processed for smoothing, and recorded more emphatically than recording at 360 dpi. Also, the non-edge portion was recorded with the same recording ink amount per unit area as recording at 360 dpi. It is meaning less to effect the smoothing of the non-edge portion whereby there is no side effect that the processed data will deteriorate in the recording quality.

Herein, the arrangement of recording dots at a high resolution of 720 dpi using a recording head of 360 dpi pitch is as shown in FIG. 13 and previously described.

FIG. 13 is an explanatory view for implementing the recording dot arrangement at high resolution. In the figure, the number of discharge orifices is 7 for the simplification of explanation. The numeral indicates the number of main scans, and the horizontal line indicates the recordable line. The sub-scan amount is 3.5 in the pitch unit at the low resolution, that is, 7 which is equal to the number of nozzles in the pitch unit at the high resolution. For example, with four scans, an effective image recording area of 22 lines at the high resolution is obtained. In this example, there are in practice 32 discharge orifices for each color, of which 31 nozzles are used to effect the sub-scan at 31 pitches equal to the number of nozzles in the pitch unit at the high resolution.

While in the above example, the high resolution processing was performed at two STEPs 3, 5 because the edge portion is detected based on the data at the low resolution, it will be appreciated that if adopting an algorithm of detecting the edge portion based on data at the high resolution, the high resolution transformation process may be performed before the edge portion detecting process (STEP 2).

Also, in the above example, the edge portion (area) was one layer which amounts to one dot of original image. This may be not only one layer, but also two or three layers, and may be set based on the ink, the recording medium, and the recording resolution to be used, and the volume of recording ink. Under high ink absorbent conditions, 10 layers may be permitted with good results.

Figure 27:
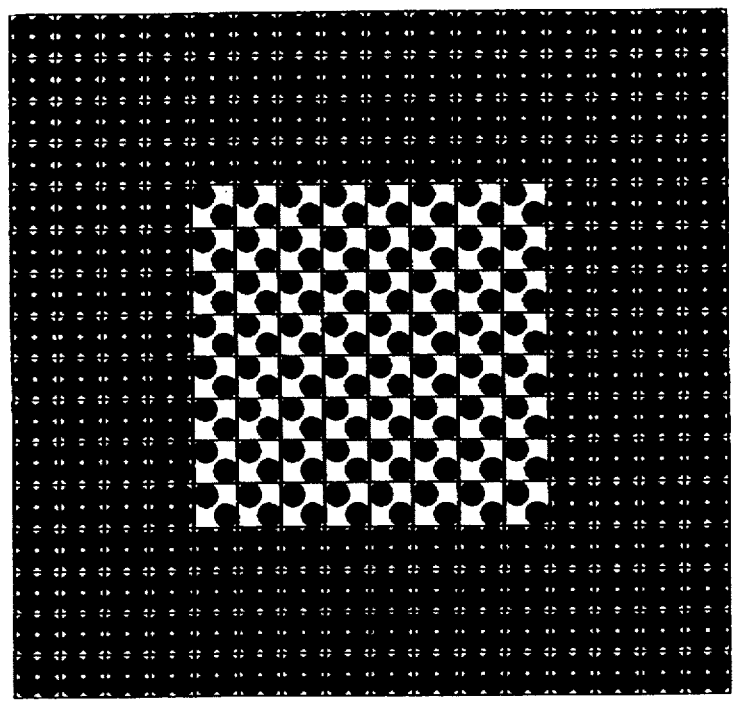
FIG. 27 is a view illustrating a four-layer edge processed as the edge portion.

FIG. 27 is an example wherein the four-layer edge is processed as the edge portion. The same figure is an illustration in which the interior of a square of 16×16 dots at the low resolution is all recorded.

In this way, one to ten layers may be recognized as the edge portion for the processing. To recognize four layers as the edge portion for the processing can be easily made by repeating the previous edge processing four times. In the first edge processing, the portion judged as the non-edge portion is extracted, and the extracted portion is further subjected to the edge processing. If this is repeated two more times, a total of four edge processings have been made, so that the data of the logical sum of the portions judged as the edge portion in the previous processing will be the four-layer edge portion.

In this example, the description was given on the assumption that the recording medium was the plain paper, but the present invention is also effective to the special-purpose paper such as for example, the coat paper having ink accepting layer. This is because if the recording medium has less blur of the ink, the present invention can be employed in recording at 1440 dpi, which is a resolution doubled in length and in breadth.

For example, when upon a new proposal, or with the development of production technology of the recording head, the recording head having less ink discharge volume can be produced inexpensively and stably, the present invention is effective in recording at e.g., 1440 dpi which is a higher resolution. Or the invention is effective in recording at 1200 dpi with more or less change of the recording pitch.

(EXAMPLE 14)

An example 14 is one in which for the original image, the resolution transformation only for the edge portion is made through a simple processing and resulting favorably. The following processing was performed for the original image as shown in FIG. 28.

Figure 33:
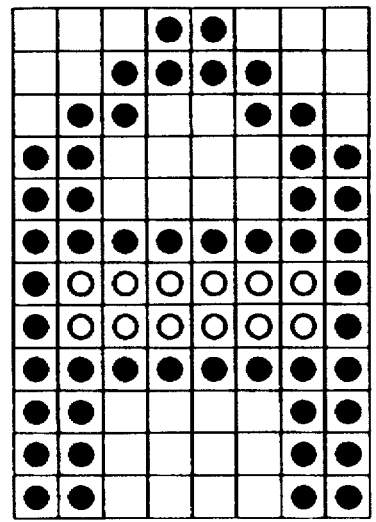
FIG. 33 is a view showing data of original image subject to edge detection in an example 14.

FIG. 33 is a view showing an example of reducing the dot of original image for the recording at higher resolution, as well as making the edge detection for the original image. ● is the edge portion and ○ is the non-edge portion.

Figure 34:
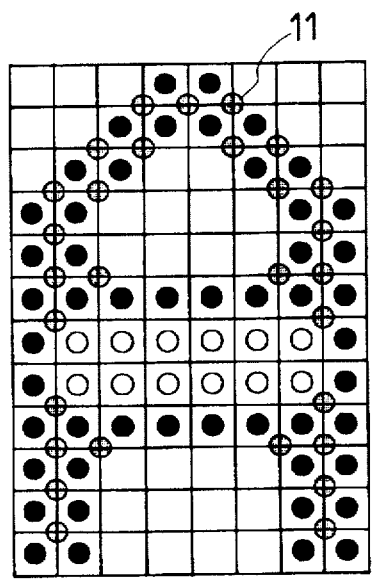
FIG. 34 is a view showing the processing in the example 14.

FIG. 34 is a view showing an example wherein for original image data, the dot is added to the lattice point 11 diagonally located in the data for the edge portion of original image. This is assumed to be a process C.

Figure 35:
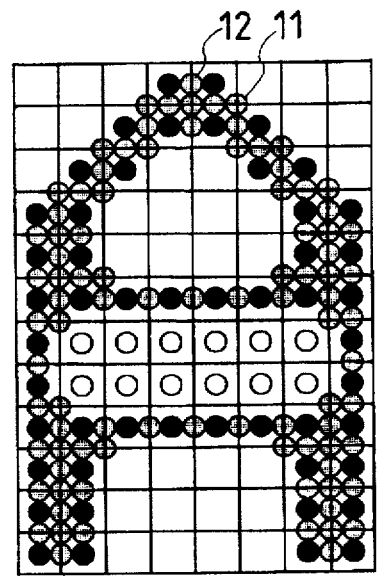
FIG. 35 is a view showing another processing in the example 14.

FIG. 35 is a view showing an example wherein for original image data, the dot is added to the intermediate lattice point 12 of adjacent two dots including the lattice point 11 diagonally located in the data for the edge portion of original image. This is assumed to be a process D.

The process C records two dots at maximum on the edge portion, and one dot at maximum on the non-edge portion in a unit area of 360 dpi. The process D records four dots at maximum on the edge portion, and one dot at maximum on the non-edge portion in a unit area of 360 dpi.

The process C is preferable when the ink is relatively less absorbent into the recording medium, and the process D is a preferable method especially when the edge portion is emphasized.

Further, the process C has the advantage of having faster recording speed than the process D or the example 13. This is due to the fact that this method is only necessary to record the dot added to the location offset by one-half pitch in length and breadth (lattice point 11) for the recording lattices of original image at the low resolution, whereby the recording can be effected at a scan rate twice that when recording at the low resolution. In the process D or the example 13 wherein there are recording dot locations (lattice point 11, 12) which are twice as many as those at the low resolution in length and breadth, the scan rate becomes quadrupled. In this way, the method of adding the dot only to the lattice point 11 diagonally located in the data of the edge portion for the original image has the merit of being able to implement the recording at the high resolution and the relatively fast speed, as well as enhancing the recording quality.

(EXAMPLE 15)

In the example 13, the recording method of obtaining the high resolution data from the low resolution data was shown. On the contrary, when the data of high resolution is pre-input into the recording apparatus, the addition of dot at STEP 6 as shown in the example 13 (smoothing process) is unnecessary. In this example, by appropriately thinning the recording data in the non-edge portion, the high resolution recorded region of the edge portion remains at the high resolution, or the non-edge portion is recorded at lower recording density of ink droplet onto the recording medium without substantial decrease in the resolution.

Figure 37:
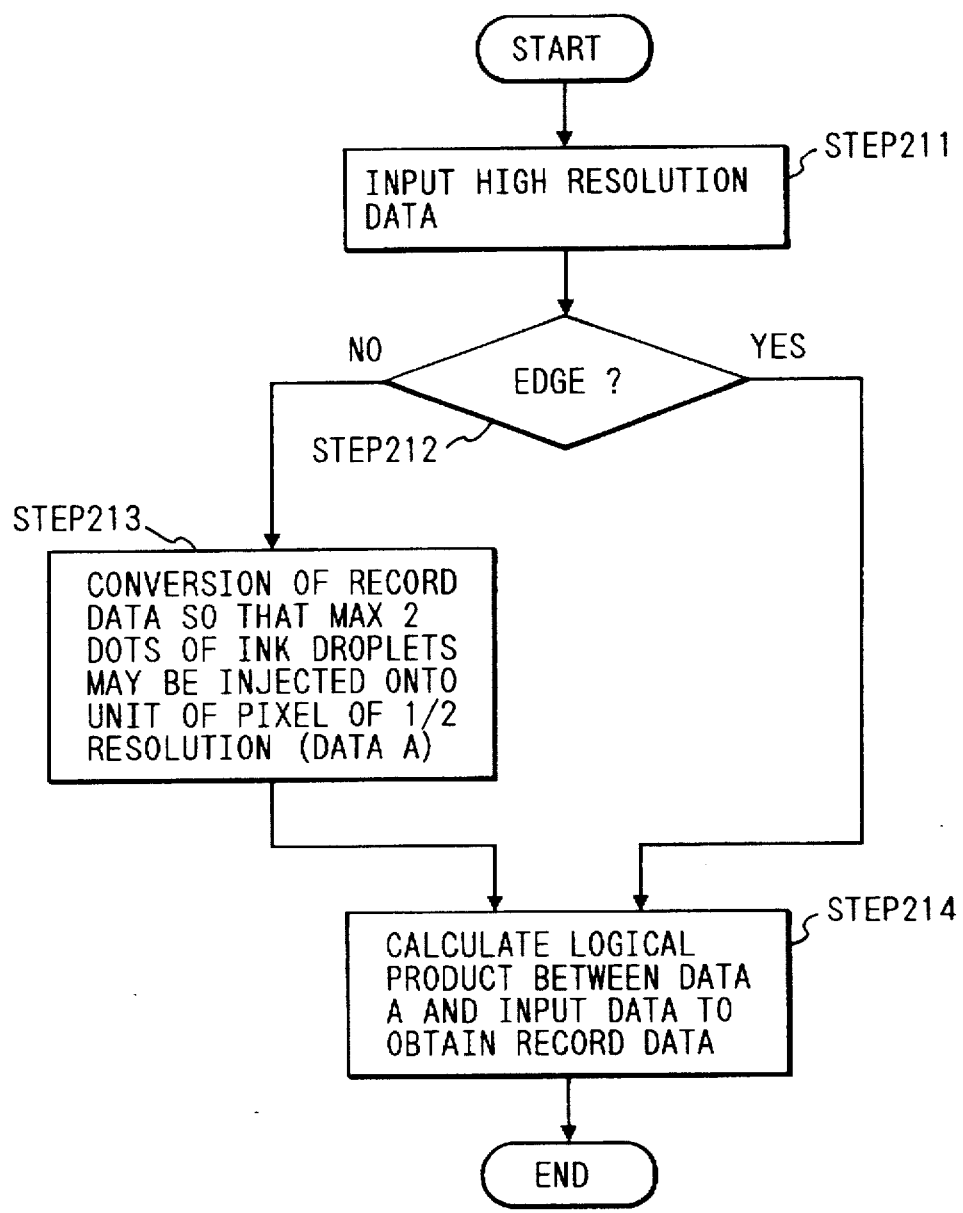
FIG. 37 is a flowchart for an example 15.

FIG. 37 is a flowchart of thinning the input data when the input data is the high resolution data which is at the second resolution.

First, at STEP 211, data is input. Data is in the high resolution or 720 dpi.

At STEP 212, the edge portion (edge region) of input data at the low resolution is detected. STEP 213 is a data thinning process (transformation) of thinning input data in the non-edge portion for the transformation into the recording data. A simple method is to transform the recording data so that the ink droplets for each color recorded in the area of one-half the resolution or 360 dpi square may be two dots at maximum. The data for thinning (the dot to be thinned 0, others 1) obtained by this processing is assumed to be data A.

STEP 214 combines the data of the edge portion and the data of the non-edge portion. Specifically, the logical sum between the thinning data A which is obtained from the data of the non-edge portion and the data of the edge portion or the input data is taken to provide the recording data.

The recording is effected through the succeeding steps which are the same as in the example 13.

(EXAMPLE 16)

While in the example 13, the recording in monochrome was principally described, it should be noted that the color recording may use two or more color inks. When two or more kinds of different color inks are deposited adjacently, the adjacent portion of different colors becomes the edge portion in monochrome, but is not the edge portion as the recording area.

In this example, the adjacent portion of different colors is recorded through the same processing as in the low resolution recording. Reference is made to FIG. 11 as previously shown.

FIG. 11 is an example in which Bk and Y are adjacently placed, black circle (●) indicating Bk and white circle (○) indicating Y. The original image is smeared data of 16×12 dots for each color. The area where the logical sum data of Bk data and Y data is not the edge portion in the adjacent portion of Bk and Y is processed as the non-edge portion for each color, at the lower recording density of ink droplet.

Figure 38:
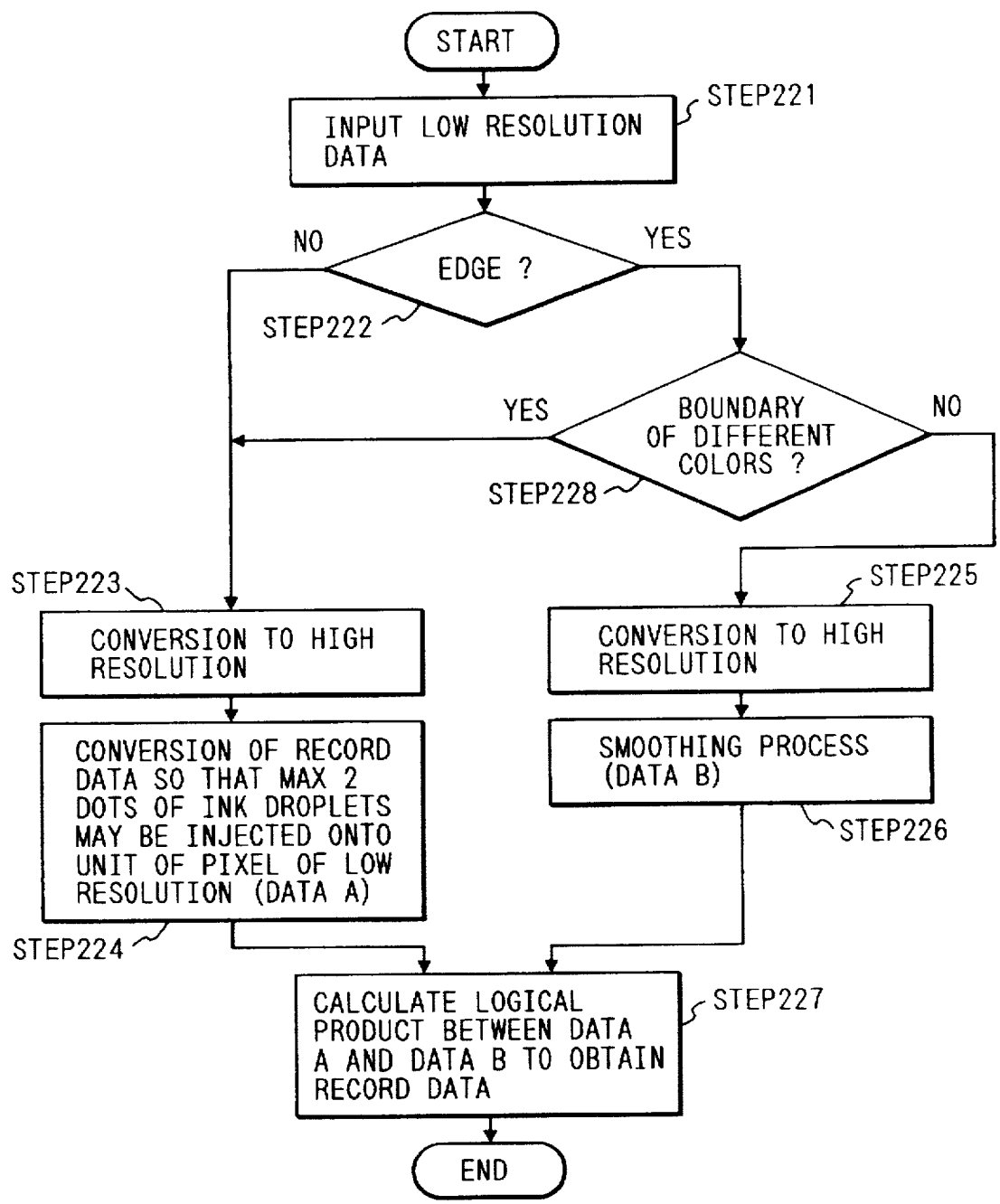
FIG. 38 is a flowchart for an example 16.

FIG. 38 is a flowchart of transforming the input data into the high resolution data which is at the second resolution, and performing the smoothing and thinning, when the input data is low resolution data which is at the first resolution. In the same figure, STEPs 221 to 227 are the same as STEPs 1 to 7 in FIG. 26, and is not described any more.

At STEP 221, the low resolution data is input, and if the data is judged as the edge portion at STEP 222, a determination is made at STEP 228 whether or not the data is different color boundary portion. Herein, the portion having four or more layers adjacent is judged as the boundary portion. For example, the area A1 is not judged as the different color boundary portion, whereby the operation goes to STEP 225, as in FIG. 26, but the area A2 is judged as the different color boundary portion, whereby the operation goes to STEP 223 for the thinning process.

(EXAMPLE 17)

Figure 32:
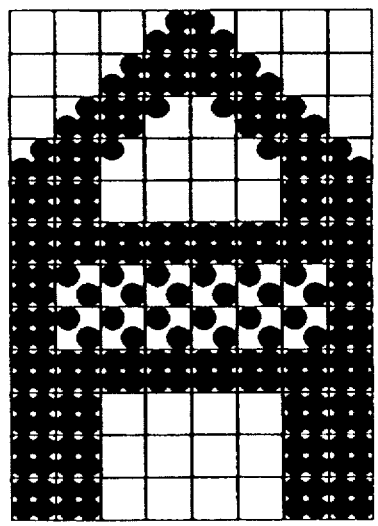
FIG. 32 is a view showing the recording data in an example 13.
Figure 39:
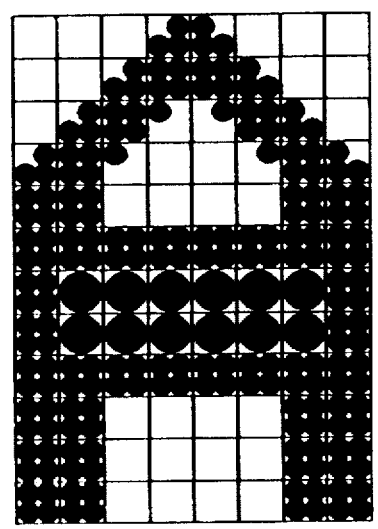
FIG. 39 is a view showing recording data in an example 17.

FIG. 39 concerning the example 17 shows another example of thinning the data in the non-edge portion as shown in FIG. 32. This example uses low resolution data in the non-edge portion, rather than high resolution data. Since the dot for the high resolution recording is 20 ng, and the dot for the low resolution is 40 ng, the same thinning effect can be obtained if one dot of low resolution data is used instead of two dots of the high resolution data.

(EXAMPLE 18)

The above-described examples 13 to 17 were described with the apparatus as shown in FIG. 11, but the present invention is also applicable in FIG. 14 as shown previously.

A print head 1 of FIG. 14 is a device having a series of nozzles, and for recording the image on the recording medium through the formation of dots by discharging ink droplets. In this example, the piezo-electric element which is the electrothermal converter is used to positively create the ink droplet diameter of different size (i.e., different ink discharge amount). By controlling the voltage value to be applied to the piezo-electric element, the ink of different discharge amount can be discharged through the same nozzle.

Figure 25:
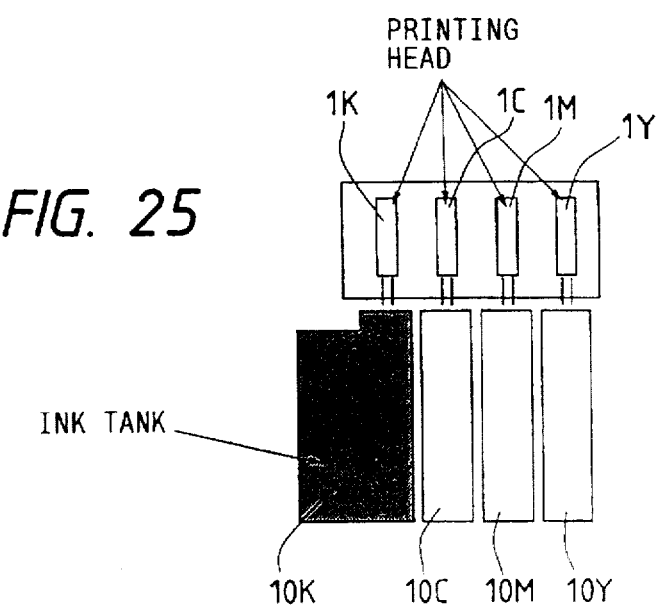
FIG. 25 is a view showing another recording head to which the present invention is applicable.

FIG. 25 is a view showing the constitution of a series of print heads and ink tanks for respective colors. For example, in forming the red (hereinafter R) image, magenta (hereinafter M) ink is caused to impinge onto the recording medium, then yellow (hereinafter Y) ink is caused to impinge onto the recorded dot of M, so that the colors are mixed to look like the red dot. In the same way, ink droplets are caused to impinge on the recording medium in the order of C, Y in forming the green (hereinafter G) image, or in the order of C, M in forming the blue (hereinafter B) image, so that the color image is formed.

The details of the recording head as shown in FIG. 25 are the same as in FIG. 15 previously shown.

The features of the above-described examples 13 to 18 are summarized as follows.

The high resolution recording and the low resolution recording are available in accordance with the uses and can be changed according to the recording mode. The recording mode is manually or automatically settable, and can be changed for every page, or even within one page.

1. Low resolution data is transformed and recorded at the high resolution.

The system comprises means for detecting the edge portion of recording data, means for transforming the low resolution data into high resolution data which has double density in the longitudinal and horizontal directions, means for discharging ink droplets in units of about one-half that when recording at the low resolution, and smoothing means, wherein the edge portion of input low resolution data is subjected to the smoothing process, and is recorded at the high resolution recording position with up to four droplets in a unit area of minimum recording pixel of the low resolution, for each color, while the non-edge portion of the low resolution data is recorded with up to two ink droplets in the same unit area for each color.

2. The high resolution data is only the edge portion, and the non-edge portion is transformed and recorded at the low resolution. When input data is the high resolution data, the edge portion is directly recorded, and the other portion than the edge portion is transformed into the low resolution data, and recorded with reduced number of recording dots (ink shot number onto the recording medium). The prevention of ink overflow and the faster recording can be effected.

3. In 1 and 2, when recording with the inks of two or more different colors, the adjacent portion of a different color is recorded through the same processing as the recording at the low resolution.

4. When the input data is high resolution data, the data other than the edge portion is adequately thinned.

5. The edge portion is the area of 1 to 10 pixels from the outermost contour of the recording data, depending on the recording condition.

6. The input data is judged whether low resolution data or high resolution data, and the recording resolution is set to either the low resolution recording mode or the high resolution recording mode.

(1) When the recording resolution is in the low resolution recording mode, and the input data is low resolution data, the input data is directly recorded.

(2) When the recording resolution is in the low resolution recording mode, and the input data is high resolution data, the input data is adequately thinned and recorded.

(3) When the recording resolution is in the high resolution recording mode, and the input data is low resolution data, the input data is transformed and recorded at the high resolution.

(4) When the recording resolution is in the high resolution recording mode, and the input data is high resolution data, the input data is adequately thinned and recorded.

As above described, according to each of the examples, it is possible to record the input data of conventional low resolution at a resolution that is doubled, by discharging ink droplets of slightly smaller volume, and without overflow of the recording ink over the recording medium.

Further, it is possible to perform high resolution recording on the plain paper. Also, the capability of recording at the high resolution means the recordability with high gradation.

Further, when the input data is high resolution data, the data can be recorded directly at the high resolution by thinning adequately the data other than the edge portion.

According to each of the above-described examples 13 to 18, input data is transformed into the recording data with which the recording head is driven, in accordance with the recording mode, and the recording can be performed in accordance with the recording mode set based on the transformed recording data, whereby the high quality recording of high resolution can be effected irrespective of the input data.

The present invention is particularly suitable for use in an ink jet recording head and recording apparatus wherein thermal energy generated by an electrothermal transducer, a laser beam or the like is used to cause a change of state or the ink to eject or discharge the ink. This is because the high density of the picture elements and the high resolution of the recording are possible.

The typical structure and the operation principle of such devices are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 59-123670 wherein a common slit is used as the ejection outlet for plural electrothermal transducers, and to the structure disclosed in Japanese Laid-Open Patent Application No. 59-138461 wherein an opening for absorbing pressure waves of the thermal energy is formed corresponding to the ejecting portion. This is because the present invention is effective to perform the recording operation with certainty and at high efficiency regardless of the type of recording head.

In addition, the present invention is applicable to a serial type recording head wherein the recording head is fixed on the main assembly, to a replaceable ship type recording head which is connected electrically with the main apparatus and which can be supplied with the ink when it is mounted in the main assembly, or to a cartridge type recording head having an integral ink container.

The provisions of the recording means and/or the auxiliary means for the preliminary operation are preferable, because they can further stabilize the effects of the present invention. Examples of such means include a capping means for the recording head, cleaning means therefore, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single head corresponding to a single color ink, or may be plural heads corresponding to the plurality of ink materials having different recording colors or densities. The present invention is effectively applied to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiments, the ink has been liquid. It also may be ink material which is solid below room temperature but liquid at room temperature. Since the ink is kept within a temperature between 30° C. and 70° C., in order to stabilize the viscosity of the ink to provide the stabilized ejection in the usual recording apparatus of this type, the ink may be such that it is liquid within the temperature range when the recording signal in the present invention is applicable to other types of ink. In one of them, the temperature rise due to the thermal energy is positively prevented by consuming heat energy for the state change of the ink from the solid state to the liquid state. Another ink material is solidified when it is left, to prevent the evaporation of the ink. In either of the cases, in response to the application of the recording signal producing thermal energy the ink is liquefied, and the liquefied ink may be ejected. Another ink material may start to be solidified at the time when it reaches the recording material.

The present invention is also applicable to such, an ink material as is liquefied by the application of the thermal energy. Such an ink material may be retained as a liquid or solid material in through holes or recesses formed in a porous sheet as disclosed in Japanese Laid-Open Patent Application No. 54-56847 and Japanese Laid-Open Patent Application No. 60-71260. The sheet is faced to the electrothermal transducers. The most effective one of the techniques described above is the film boiling system.

The ink jet recording apparatus may be used as an output terminal of an information processing apparatus such as computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

What is claimed is:

1. An ink jet recording method using an ink jet recording head having n resolution for performing recording at m (>n) resolution onto a recording medium, said method comprising the steps of:

setting a print mode in accordance with resolution;

setting a condition for discharging ink droplets (ink volume×number) in a range not exceeding the maximum ink shot amount per unit area of said recording medium in accordance with recording conditions including the resolution and the recording medium and environmental conditions;

creating binary data for recording from multi-value data in accordance with the resolution and the set print mode; and forming an ink droplet image of the size in accordance with the resolution on said recording medium under the set conditions using said binary data for recording.

2. An ink jet recording method according to claim 1, wherein said environmental conditions include at least one of conditions concerning temperature information of said ink jet recording head and environmental temperature and humidity.

3. An ink jet recording method according to claim 2, wherein said recording conditions include at least one of the ink absorbing property of the recording medium, the moisture absorbing state of the recording medium, the ink characteristic, or the presence or absence of fixing means.

4. An ink jet recording method according to claim 1, wherein said set print mode includes a mode in which either of a multi color mode and a monochrome mode is set, wherein in the multi color mode, the conditions for determining the ink amount for each color are given in accordance with the maximum number of color inks to be used.

5. An ink jet recording method according to claim 1, wherein said set print mode includes a mode of emphasizing an edge portion of an image with relatively higher density by determining said edge portion, wherein edge data is relatively increased over surrounding data.

6. An ink jet recording method according to claim 1 or 5, wherein said set print mode includes a mode of processing characters and an image differently by determining the character or the image.

7. An ink jet recording method according to any one of claims 1 to 5, wherein said recording head is a recording head for discharging the ink by the use of thermal energy, said conditions including giving the thermal energy.

8. An ink jet recording method according to claim 1, wherein said step of creating binary data for recording includes changing the gradation characteristic of output data with respect to input data in accordance with resolution.

9. An ink jet recording method according to claim 1, further comprising a step of performing a recording head stabilization process in accordance with the resolution transform prior to the recording of m resolution, upon the mode change from the n resolution recording to the m resolution recording.

10. An ink jet recording method according to claim 1, further comprising a step of modifying automatically or manually said conditions of said recording head by performing a test print onto the recording medium in the m resolution recording.

11. An ink jet recording apparatus using an ink jet recording head having n resolution for performing recording at m (>n) resolution, comprising:

means for forming a test print image on a predetermined recording medium under set conditions for discharging ink droplets (ink volume×number) in a range not exceeding the maximum ink shot amount per unit area of said predetermined recording medium in accordance with resolution; and means for modifying said set conditions in accordance with said test print image.

12. An ink jet recording apparatus using an ink jet recording head having n resolution for performing recording at m (>n) resolution, comprising:

means for performing the recording in accordance with resolution by changing a recording medium or a recording head driving condition; and means for stabilizing said recording head in accordance with a change of said resolution.

13. An ink jet recording method using an ink jet recording head having n resolution for performing recording at m (>n) resolution, said method comprising the steps of:

setting a condition for discharging ink droplets (ink volume×number) in a range not exceeding the maximum ink shot amount per unit area of a recording medium in accordance with recording conditions including resolution and the recording medium;

creating binary data for recording from multi-value data in accordance with the resolution and a set print mode; and forming an ink droplet image of a size in accordance with the resolution on said recording medium under the set conditions using the binary data for recording.

14. An ink jet recording method according to claim 13, further comprising a step of inputting the multi-value data.

15. An ink jet recording method according to claim 13, further comprising a step of inputting binary data, and a step of transforming input binary data into multi-value data.

16. An ink jet recording method according to claim 13, further comprising a step of inputting binary data or multi-value data, and a step of transforming binary data amount input data into multi-value data.

17. An ink jet recording method according to claim 13, wherein said creation step further comprises lowering the level of multi-value data to be recorded.

18. An ink jet recording method according to claim 17, wherein said creation step further includes lowering the level other than near the maximum value of multi-value data to be recorded, leaving the level near the maximum value unchanged, or lowering the level near the maximum value at a smaller rate than the level other than near the maximum value of multi-value data to be recorded.

19. An ink jet recording method using an ink jet recording head having n resolution for performing the recording at m (>n) resolution on a recording medium, said method comprising the steps of:

setting either a low resolution recording mode for recording at n resolution or a high resolution recording mode for recording at m resolution; and transforming by lowering the level of multi-value data to be recorded, when said set recording mode is the high resolution recording mode.

20. An ink jet recording method according to claim 19, wherein said transformation step includes lowering the level other than near the maximum value of multi-value data to be recorded, leaving the level near the maximum value unchanged, or lowering the level near the maximum value at a smaller rate than the level other than near the maximum value of multi-value data to be recorded, when said set recording mode is the high resolution recording mode.

21. An ink jet recording method according to claim 19, further comprising a step of determining whether or not data to be recorded is an edge portion of an image, wherein said transformation step includes lowering the level other than near the maximum value of multi-value data to be recorded, leaving the level near the maximum value unchanged, or lowering the level near the maximum value at a smaller rate than the level other than near the maximum value of multi-value data to be recorded, when said set recording mode is the high resolution recording mode and the data to be recorded is the edge portion of said image.

22. An ink jet recording method according to claim 19, further comprising a step of determining whether or not the multi-value level of the data to be recorded is at or near the maximum value, wherein said transformation step includes lowering the level of the multi-value data to be recorded, when the multi-value level of the data to be recorded is not at or near the maximum value, leaving the level of the multi-value data to be recorded unchanged, or lowering the level of the multi-value data to be recorded at a smaller rate than the level other than near the maximum value of multi-value data to be recorded, when the multi-value level of the data to be recorded is at or near the maximum value.

23. An ink jet recording method according to claim 19, further comprising a step of determining whether the data to be recorded is black or other colors, wherein said transformation step includes lowering the level other than near the maximum value of multi-value data to be recorded, leaving the level near the maximum value unchanged, or lowering the level near the maximum value at a smaller rate than the level other than near the maximum value, when the set recording mode is the high resolution recording mode and the data to be recorded is black, or lowering the level of the multi-value data to be recorded, when said set recording mode is the high resolution recording mode, and the data to be recorded is said other colors.

24. An ink jet recording method for effecting recording using a recording head for discharging ink, comprising the steps of:

setting either a first recording mode for recording by discharging the ink of relatively large amount at low resolution, or a second recording mode for recording by discharging the ink of relatively small amount at high resolution;

transforming input data into recording data for driving said recording head in accordance with said first or second recording mode which has been set; and controlling the recording in accordance with the recording mode which has been set in said setting step, based on recording data transformed.

25. An ink jet recording apparatus according to claim 24, wherein said transformation step includes transforming the input data into high resolution data, when input data is low resolution data, and thinning a continuous area of high resolution data transformed, wherein said second recording mode is set.

26. An ink jet recording apparatus for performing recording using a recording head for discharging ink, comprising:

setting means for setting either a first recording mode for recording by discharging the ink of relatively large amount at a low resolution, or a second recording mode for recording by discharging the ink of relatively small amount at a high resolution;

transformation means for transforming input data into recording data for driving said recording head in accordance with said first or second recording mode which has been set by said setting means; and recording control means for controlling the recording in accordance with the recording mode which has been set by said setting means, based on recording data transformed by said transformation means.

27. An ink jet recording apparatus according to claim 26, wherein said transformation means transforms the input data into high resolution data, when input data is low resolution data, wherein said second recording mode is set.

28. An ink jet recording apparatus according to claim 27, wherein said transformation means adds data to an edge portion of input data of low resolution, and leaves the portion other than the edge portion unchanged, or transforms the input data into high resolution data by additionally recording the input data further twice.

29. An ink jet recording apparatus according to claim 28, wherein said transformation means adds data to the edge portion of input data of low resolution in such a way as to add data to an intermediate position between adjacent data both crosswise and diagonally, or only diagonally, in the edge portion of input data of low resolution.

30. An ink jet recording apparatus according to claim 27, wherein said transformation means transforms only non-edge portion data into thinned data.

31. An ink jet recording apparatus according to claim 28, wherein said edge portion is a peripheral section of the recording area.

32. An ink jet recording apparatus according to claim 31, wherein said edge portion is a peripheral section of the logical sum data of multi-color data when the multi-color data is used.

33. An ink jet recording apparatus according to claim 26, wherein said transformation means transforms input data into thinned data, when the input data is high resolution data, wherein the first mode is set.

34. An ink jet recording apparatus according to claim 33, wherein said transformation means transforms only data of a non-edge portion into thinned data.

35. An ink jet recording apparatus according to claim 34, wherein an edge portion is a peripheral section of the recording area.

36. An ink jet recording apparatus according to claim 35, wherein said edge portion is a peripheral section of the logical sum data of multi-color data when the multi-color data is used.

37. An ink jet recording apparatus according to claim 26, wherein said recording head discharges the ink by the use of thermal energy.

38. An ink jet recording apparatus according to claim 26, wherein said recording head discharges the ink by the use of mechanical energy.

39. An ink jet recording apparatus according to claim 26, wherein said recording head is capable of recording in multiple colors.

40. An ink jet recording apparatus according to claim 26, further comprising conveying means for conveying a recording medium which is recorded by said recording head.

41. An ink jet recording apparatus according to claim 26, wherein said recording apparatus is applied to a copying machine.

42. An ink jet recording apparatus according to claim 26, wherein said recording apparatus is applied to a facsimile machine.

43. An ink jet recording apparatus according to claim 26, wherein said recording apparatus is applied to a computer terminal.

* * * * *

UNITED STATES PATENT AND TRADEMARK OFFICE
CERTIFICATE OF CORRECTION

PATENT NO. : 5,739,828
DATED : April 14, 1998
INVENTOR(S) : MORIYAMA ET AL.

It is certified that error appears in the above-identified patent and that said Letters Patent is hereby corrected as shown below:

Title page, item
[56] References Cited:
　　FOREIGN PATENT DOCUMENTS, "01212176" should read --1-212176--.

COLUMN 6:
　　Line 49, "32" should be deleted.

COLUMN 7:
　　Line 11, "channels" (second occurrence) should read --channels.--.
　　Line 12, "arrayed." should be deleted.

COLUMN 9:
　　Line 49, "like" should read --line--.

COLUMN 13:
　　Line 31, "(sevencolor)" should read --(seven-color)--.

COLUMN 15:
　　Line 53, "amount" should read --amounts--.
　　Line 61, "belt" should read --belts--.

UNITED STATES PATENT AND TRADEMARK OFFICE
CERTIFICATE OF CORRECTION

PATENT NO. : 5,739,828
DATED : April 14, 1998
INVENTOR(S) : MORIYAMA ET AL.

It is certified that error appears in the above-identified patent and that said Letters Patent is hereby corrected as shown below:

COLUMN 18:
    Line 5, "shows" should read --show--.
    Line 45, "aspects sides," should read --aspects,--.

COLUMN 26:
    Line 41, "of" should read --of the--.

COLUMN 27:
    Line 35, "coat" should read --coated--.

COLUMN 33:
    Line 22, "multi color" should read --multi-color--.
    Line 23, "multi color" should read --multi-color--.

Signed and Sealed this

Ninth Day of February, 1999

Attest:

Attesting Officer

*Acting Commissioner of Patents and Trademarks*